United States Patent [19]

Stock et al.

[11] 3,940,628

[45] Feb. 24, 1976

[54] APPARATUS AND PROCESS FOR HANDLING DANGEROUS FLUENT MATERIAL

[75] Inventors: Arthur J. Stock, Lakewood; Donald E. Christofer, Willowick; Joseph E. Brinza, Euclid, all of Ohio

[73] Assignee: Stock Equipment Company, Cleveland, Ohio

[22] Filed: Oct. 25, 1973

[21] Appl. No.: 409,372

Related U.S. Application Data

[62] Division of Ser. No. 182,088, Sept. 20, 1971.

[52] U.S. Cl. .................. 250/435; 250/506; 250/517

[51] Int. Cl. .................................................. C09k 3/00

[58] Field of Search ......... 214/1 CM; 250/506, 517, 250/435, 507

[56] References Cited

UNITED STATES PATENTS

| | | | |
|---|---|---|---|
| 2,828,875 | 4/1958 | Ginns | 250/515 |
| 2,861,699 | 11/1958 | Yourmans | 241/1 CM |
| 2,868,992 | 1/1959 | Monk | 250/517 |
| 2,942,116 | 6/1960 | Axelrad | 250/517 |
| 3,090,740 | 5/1963 | Huston et al. | 250/517 |
| 3,136,432 | 6/1964 | Nicoll et al. | 214/1 CM |
| 3,213,031 | 10/1965 | Heinemann | 252/301.1 W |
| 3,265,898 | 8/1966 | Lehmev | 250/517 |
| 3,295,389 | 1/1967 | Walischmiller | 250/515 |
| 3,749,917 | 7/1973 | Kuchevev | 250/506 |

*Primary Examiner*—Harold A. Dixon
*Attorney, Agent, or Firm*—Bosworth, Sessions & McCoy

[57] ABSTRACT

Systems, apparatus and methods are disclosed for disposing of radioactive waste materials by placing them into a container such as a steel drum, together with cement or other solidifying agent and water or other suitable liquid in amounts sufficient to provide eventually a solidified mixture of predetermined amounts of cement or other solidifying agent and radioactive material, closing the drum, agitating the mixture in the drum for mixing the contents, and then storing the drum for at least a period of time sufficient to permit partial decay of radioactive materials or to await available time for shipment. Also disclosed are remotely controlled apparatus for handling both empty and filled drums, for placing the drums in and removing drums from enclosed drumming equipment where they have been filled and agitated, for accurately placing the drums containing radioactive material in storage, and for removing the drums from storage and loading them on a vehicle for transportation. All of these operations are done by remote control with a high degree of safety to the operators and maintenance personnel from radiation and freedom of the ambient from radiation pollution.

10 Claims, 18 Drawing Figures

Fig. 9
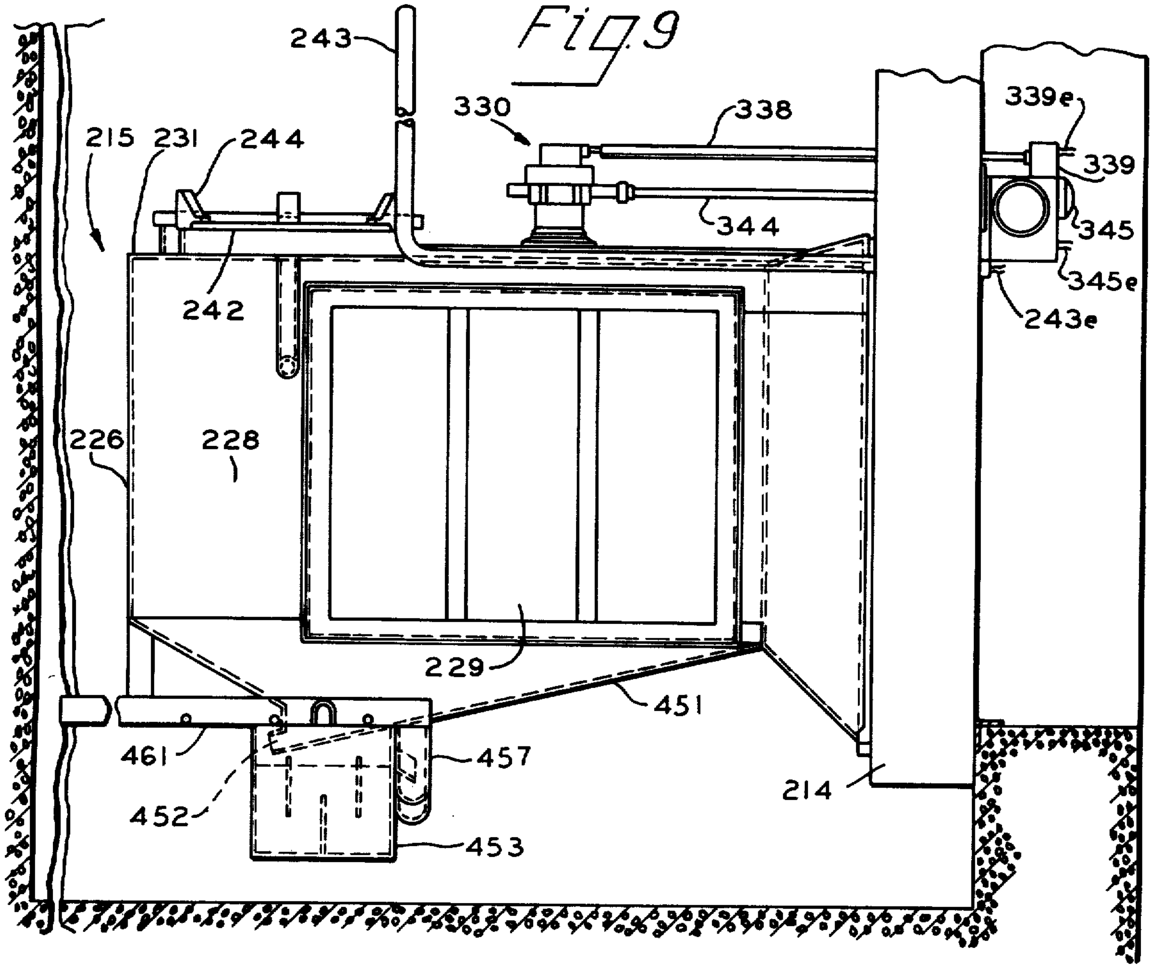
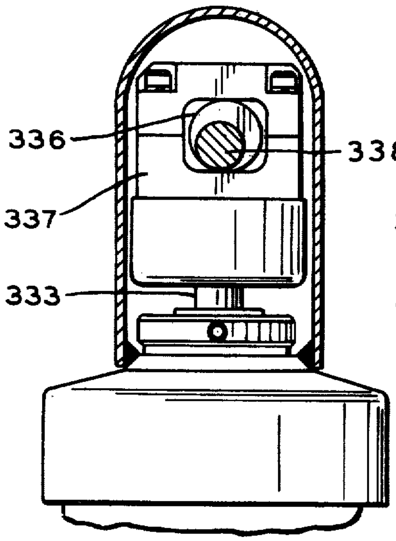
Fig. 14
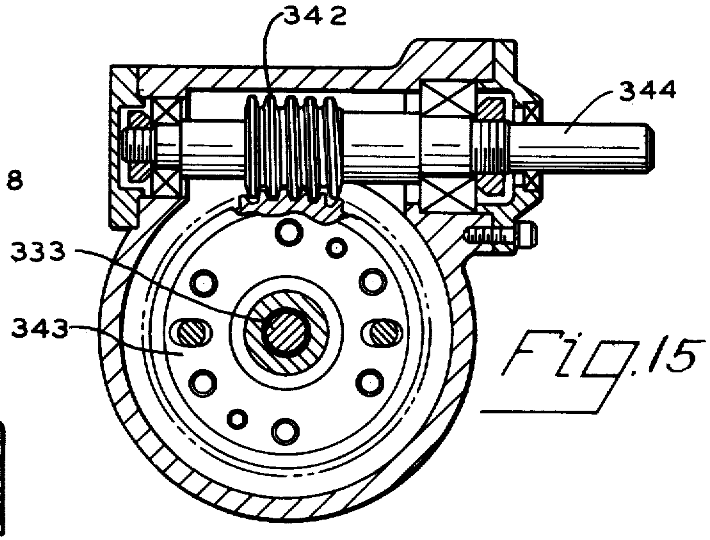
Fig. 15

Fig. 13
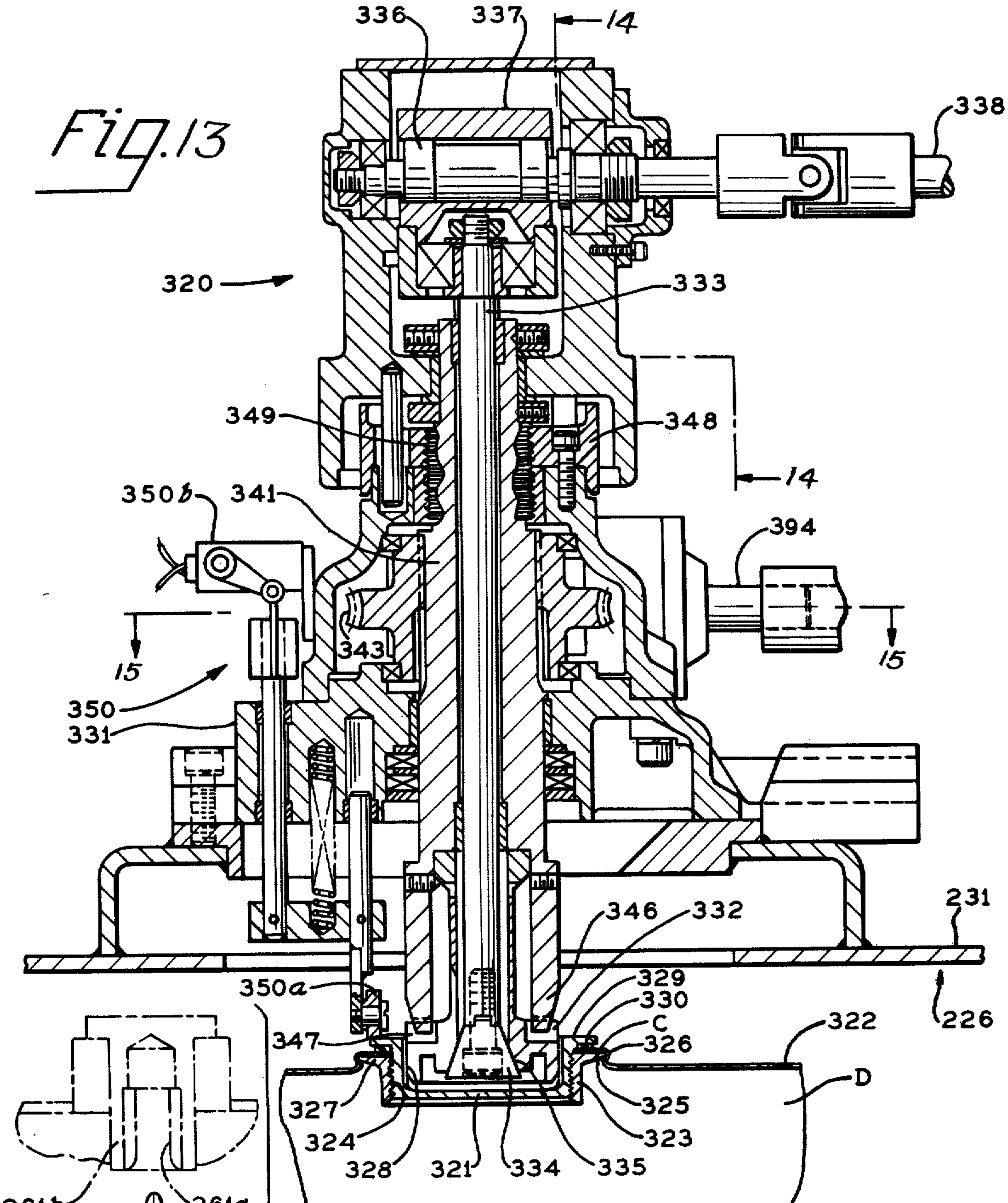
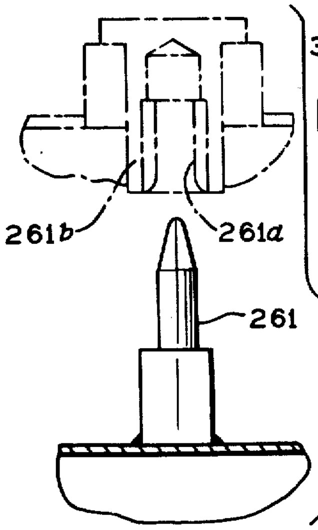
Fig. 12

Fig. 17
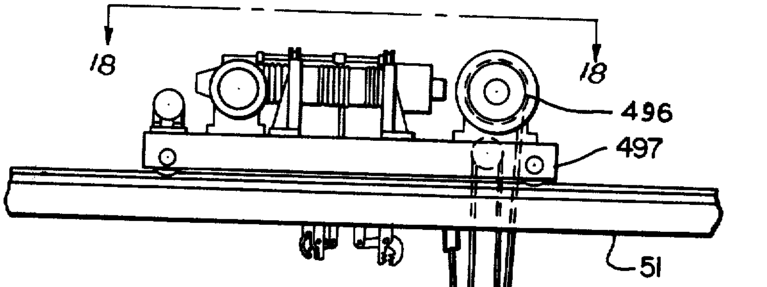
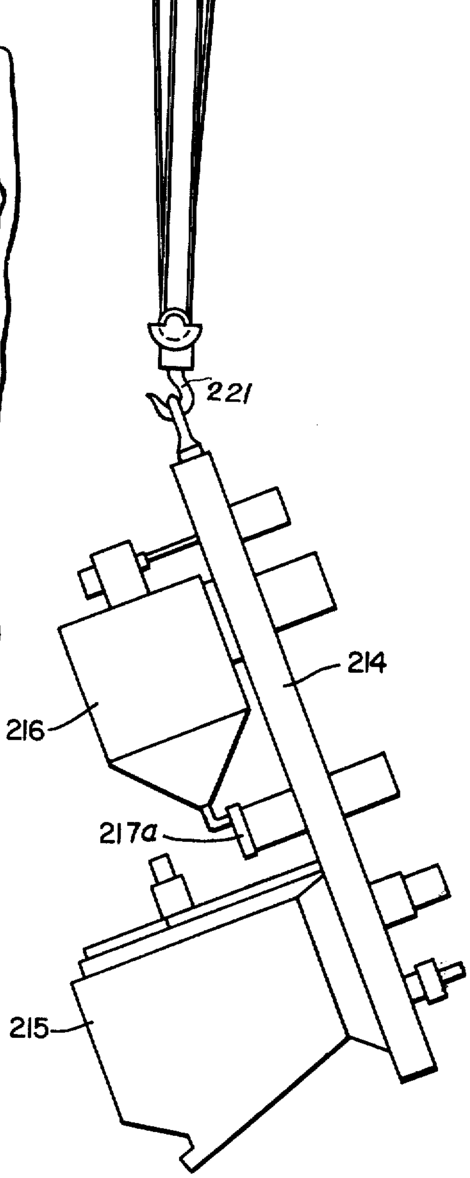
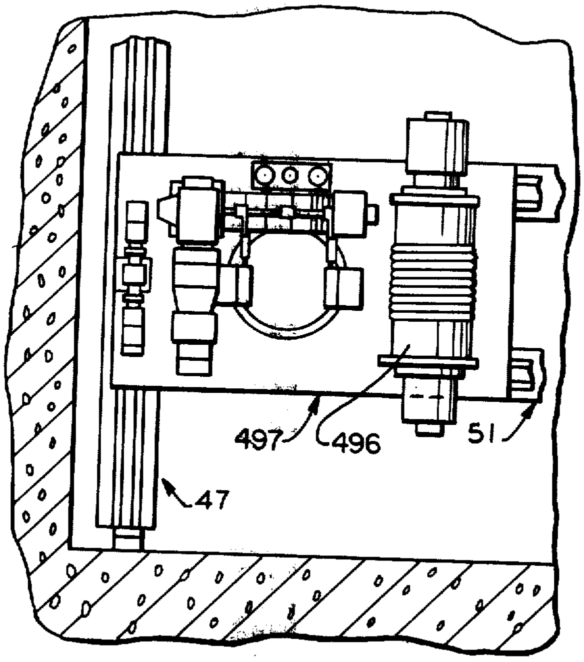
Fig. 18

APPARATUS AND PROCESS FOR HANDLING DANGEROUS FLUENT MATERIAL

REFERENCE TO RELATED APPLICATION

This application is a division of our co-pending allowed application Ser. No. 182,088 filed Sept. 20, 1971, which is incorporated herein by reference.

BACKGROUND OF THE INVENTION

This invention relates to apparatus and method for disposition of radioactive waste materials.

While the invention may be used for the packaging and disposition of various types of radioactive or chemically dangerour wastes, it can be exceptionally advantageously employed in the disposition of radioactive wastes as they occur in nuclear electric power generating stations.

In known boiling water reactor plants, water is passed through the nuclear reactor through suitable conduits and is heated and converted to steam by the heat of the reactor. This steam passes through a turbine that drives an electric generator, then is recondensed and returned to the reactor to be reheated and converted into steam and so on. This is a closed system.

In pressurized water reactor systems, there is a first closed conduit loop extending through the nuclear reactor and then outside the reactor where it passes through a heat exchanger. The body of water or other liquid in the first closed loop is heated by the nuclear reactor, but the liquid is kept at such a high pressure, usually several thousand pounds per square inch, that it is not converted into steam or vapor. There is a second closed conduit loop carrying a body of water that extends through the heat exchanger out of contact with the liquid in the first loop. The water in this second circuit and thereby converted into steam which passes in the usual manner through a turbine driving an electric generator after which the steam is condensed and returned to the heat exchanger where it is again reheated.

In each such system water of the greatest possible purity is used. Nevertheless, minor amounts of impurities are present in he water initially introduced into the conduits. Further impurities appear because of the action of the water on the metal of pipes and conduits through which it passes. These impurities may become radioactive, particularly in water that passes through the reactor. Traces of cobalt leached out of stainless steel piping are particularly troublesome, since cobalt develops an intense form of radioactivity having a long half life.

In both boiling water and pressurized water reactors, it is a practice to subject the water to cleaning action by passing it through beds of ion-exchange resins. Such resins are of known composition. In general, they act similarly to natural or synthetic materials used in commercial water treating equipment. Through chemical and filtering action, they remove dissolved and suspended impurities, thus maintaining the water at the desired high purity. Otherwise the accumulation of impurities could result in scaling on the heat transfer surfaces, which would result in loss of efficiency or difficulty in operations. Resin particles of one type widely used for this purpose are those approximately 20 mesh in size. Resin particles of another widely used type are much smaller, approximating 300 mesh in size.

The contaminated resins of either type are removed from the water treating vessel by sluicing them out with water. The resulting slurry or dispersion is collected in a waste resin tank at the plant. The apparatus disclosed hereafter is particularly well adapted for disposition of this type of radioactive slurry.

Another type of radioactive waste material that may be handled by the present invention is "evaporator bottoms". These include concentrated liquid wastes from the plant, such as solutions containing boric acid, borax, sodium sulphate and the like which are used in the control of the reactor or for washdown of equipment for decontamination. Evaporator bottoms are also obtained from the collected water that is used for washing down portions of equipment or plant, wash water for employees, and chemical laboratory liquid wastes. This water containing radioactive impurities is temporarily stored and periodically portions of it are evaporated, leaving a solution or dispersion containing reactive materials in water that are known as "evaporator bottoms".

Stringent laws, rules and regulations govern the disposition of radioactive wastes and their transportation over highways, on railroads and by other modes of transportation. In general, the material must be shielded so that radiations emanating from the material do not exceed maximum levels established by the laws and regulations. Furthermore, it is desired that in a case of an accident causing dumping of a radioactive load, there should be no fluidic materials that can penetrate the grounds or mix with streams or ground water and cause radioactive contamination. It has therefore been proposed to provide a mixture of resin particles containing radioactive material, cement as a solidifying agent, and water in a container such as a steel drum, and to allow the mixture to solidify in the drum.

However, prior systems for putting radioactive materials into a drum or other container in general require that operators and maintenance personnel be exposed to radiation, even though such system may be intended to protect personnel. For example, the operators in many cases must go into areas containing radiations to open drums or close them or to insert nozzles in the drums or to handle the drums in storage. In some systems an operator may stand behind a shield wall, but must extend his arms into a radioactive zone, and expose his head to see, to connect pipes for feeding radioactive material. If spills occur, the operator must go into the radioactive zone to clean up spills. In prior operations where drums are stacked in multiple layers in decay storage areas, the operator must often go into such areas to place planks between the layers. Maintenance men must go into radioactive areas to work on equipment requiring maintenance at intervals, such as conveying equipment, motors, and switches. The total amount of radiation to which personnel can be safely exposed is limited by physiological reasons; therefore, personnel must be controlled as to their duties, and the amount of radiation to which they are exposed frequently checked to avoid their exposure to an excessive amount of radiation that can adversely affect health. Moreover, in operation of the nuclear plant, if an emergency should arise correction of which would require exposure of operators or maintenance men to radiation during a time when all available men had reached their limits of radiation tolerance, a shutdown of the plant might be necessary or other adverse consequences might result because of lack of operators or maintenance men having safe radiation tolerances.

Moreover, prior systems do not in general provide desired close control to insure that proper amounts of radioactive material, cement, or water are put into the drum to insure proper solidification of drum contents. It is imperative to avoid improper loading of the drum or mixing of drum contents.

Moreover, prior systems can on occasion spill radioactie materials on the outside of the drums or on the floor. If the spill is on the drum, it is necessary to decontaminate the drum prior to shipment. If the spill is on the floor, then a certain amount of dust can be generated as the material dries. Such dust, which is radioactive, could find its way through the plant and thus make the plant unsafe because of radioactivity. Spilled materials also can collect in floor drains and clog them. Prior systems for putting radioactive material into drums in general have loaded drums in an open space, so there was no way of containing or taking care of the problems caused by spills of radioactive material.

Some previous systems have numerous operating mechanical parts requiring periodic maintenance, such as motors and electrical switches, in radioactive areas. Maintenance of such equipment can expose personnel to considerable radiation.

Previous equipment loads drums containing radioactive material onto trucks or casks in a haphazard fashion, and thus, not loading the truck or cask to full capacity, would lose lading and could cause damage to the drums or drum enclosure.

Previous systems, because of loss of electrical power or air pressure or improper handling of the drum handling means, could topple a drum or cause irregularities in operation which could cause spillage of radioactive material. Previous systems did not provide for an accurate weight of resin to a weight of cement ratio in order to insure that the drum contents would be properly solidified with the most economical use of cement and with the lowest transportation costs. In prior systems that filter the resin in the drums to remove water, costs are understandably higher for the drum because of the added equipment contained therein.

Some prior systems mix radioactive resins, cement and water in a mixture outside of a drum. This involves exposure of considerable amounts of equipment to radioactivity and possibilities of considerable exposure of personnel to radioactivity. Moreover, the mixer must be cleaned after each use, which is difficult because the cement sticks to the mixer; moreover, the mixer will become radioactive and hence unsafe in time considerably shorter than the life of the plant, necessitating replacement expense. Some prior systems mix these materials in the drum; but if an open top drum is used, considerable spillage occurs during mixing, and if the drum is rolled about its lengthwise axis to mix its contents a core of poorly mixed materials is formed in the center of the drum.

Most if not all prior systems lack fail-safe features to prevent unsafe conditions in the event of failure of operations of any portion of the equipment.

SUMMARY OF THE INVENTION

It is a general object of the present invention to overcome the above and other problems relating to the disposition of radioactive waste materials. A further object is the provision of apparatus and methods for overcoming as many as desired of the above indicated problems, as well as other problems. Another object is to provide apparatus and methods in which fluent materials containing radioactive or other dangerous materials can be placed and mixed in containers along with, if desired, solidifying agents such as concrete or asphalt or plastics. Another object is to provide apparatus and methods for moving containers into storage and accurately locating them there, moving them out of storage to another location such as on a transportation vehicle and locating them there, and for recovering a container if it should be upset; and apparatus and methods that can eliminate undesired radiation from areas in which personnel work. A further object is to provide apparatus for carrying out such operations by remote control so personnel need not be exposed to radiation during maintenance of equipment. A further object is provision of apparatus which can be easily repaired or maintained with little if any exposure of personnel or surrounding environment to hazardous radiation. Another object is to provide apparatus that has fail-safe features that prevent the development of dangerous or unsafe conditions in the event of failure of operation of the apparatus as because of failure of power, air pressure, or other energy source.

To accomplish these and other objects, the present invention provides apparatus and methods for packaging fluent material such as dangerous or radioactive liquids, or slurries containing radioactive or otherwise dangerous particulate material without human handling or the necessity of personnel connecting pipes or the like, comprising means controllable by remote control for moving a container into any of a variety of preselected positions; means controllable by remote control for introducing into a container in a preselected loading position an essentially predetermined amount of such fluent material in which preferably the proportion of liquid to radioactive or other dangerous material in accurately predetermined; means controllable by remote control for closing the container; means controllable by remote control for agitating the container to mix thoroughly the contents thereof; and means to receive the closed container containing its mixed contents, such means being at a location away from the location at which the liquid is introduced into said container and the location in which the container is agitated. The last named means may be a storage location, or a location at which said container is loaded onto a vehicle for transportaion, or both.

The apparatus may comprise a building including walls resistant to passage of radioactivity, which walls segregate from locations occupiable by personnel the location at which the container has radioactive material introduced and at which the container is agitated to mix its contents, and if desired a storage location.

The apparatus may comprise means for forming in a tank a dispersion of an essentially predetermined proportion of particulate material and liquid, then passing from the tank into a container an essentially predetermined amount of the dispersion.

The apparatus preferably comprises remotely controllable means for closing the container; and remotely controllable means for agitating the container to mix its contents. The apparatus may comprise remotely controllable means for opening the container prior to introduction of fluent material.

The apparatus preferably comprises means for weighing the container before it is filled or after it has been closed, or both, to check on the amount of material introduced.

BRIEF DESCRIPTION OF THE DRAWINGS

These and other objects and features of the invention will be apparent from the following description of a preferred embodiment of the invention in connection with the accompanying drawings in which:

FIG. 9 is a side elevation of the lower portion of the drumming apparatus, in general corresponding to the side elevation of FIG. 8;

FIG. 12 is a detail to a still larger scale, showing means for securing the cradle frame in each elevated position, the view of the securing pin being generally from line 12—12 of FIG. 10;

FIG. 13 is a section through the cap-handling means for unscrewing a cap of a drum, holding it until it is desired to insert it again, and for re-inserting and tightly screwing in the cap of a drum, the scale being considerably larger than that of FIGS. 6–9;

FIG. 14 is a section along line 14—14 of FIG. 13;

FIG. 15 is a section along line 15—15 of FIG. 13;

FIG. 17 is a side elevation showing the trolley of FIG. 18 is used in hoisting a shield wall and associated equipment mounted on the shield wall; and FIG. 18 is a fragmentary plan view taken on line 18—18 of FIG. 17 showing a modified form of trolley for the overhead crane apparatus, this trolley embodying a heavy duty hoist capable of lifting heavy portions of the apparatus, such as the shield wall or other equipment, out of or into the illustrated apparatus.

DISCLOSURE OF PREFERRED EMBODIMENT

General Arrangement

Figure 1:
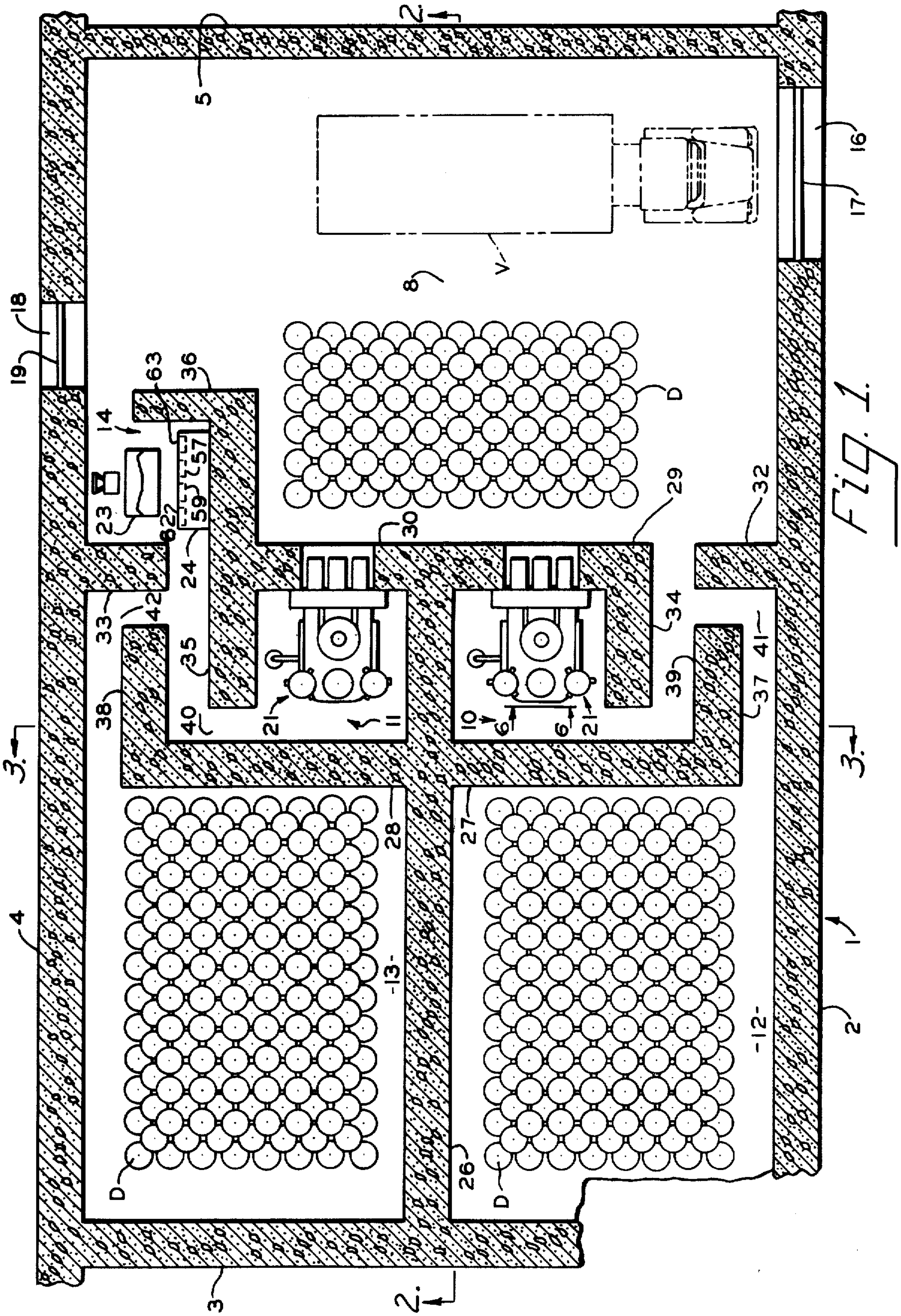
FIG. 1 is a plan section along line 1—1 of FIG. 2, of a building and internal equipment embodying the present invention and for carrying out processes of the invention, the scale being much smaller than full size.

For illustrative purposes, the below described embodiment of the invention will be described in connection with the disposition of radioactive waste material in the form of resin particles containing radioactive materials like those described above, and in the form of evaporator bottoms, by putting the radioactive material including water, and cement as a solidifying agent, into a steel drum; mixing these materials in the drum; moving the drum into storage; allowing the mixture to solidify and radioactivity to decay in storage; and then moving the drum to a vehicle for transportation.

For convenience, the term "drum" is used hereafter to designate steel drums or barrels as such, as well as suitable other types of containers for the indicated purposes. While for convenience cement is disclosed as the solidifying agent and water as the liquid, it is to be understood that other suitable types of solidifying agents such as asphalt or certain natural or synthetic resins, and that suitable liquids other than water, may be used.

The reference numerals used herein and the terminology employed correspond to those used in said copending application Ser. No. 182,088, the entire disclosure of which is hereby incorporated by reference and made a part of the disclosure of the present application.

Figure 2:
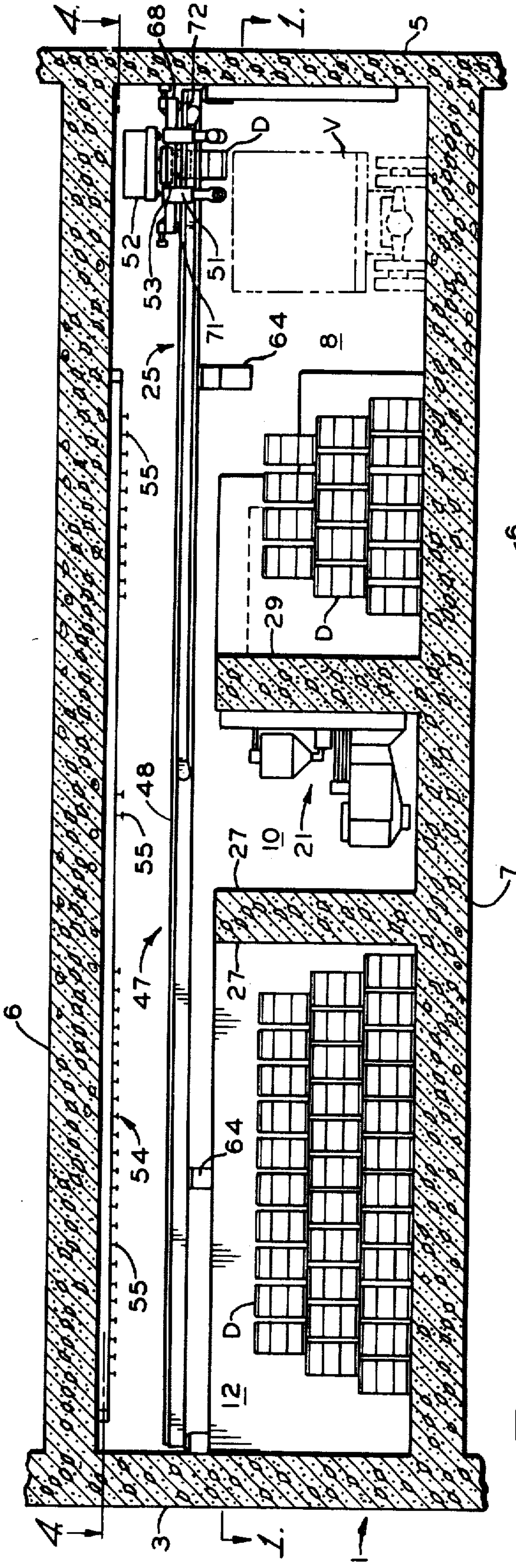
FIG. 2 is a section along line 2—2 of FIG. 1 and to the same scale.
Figure 3:
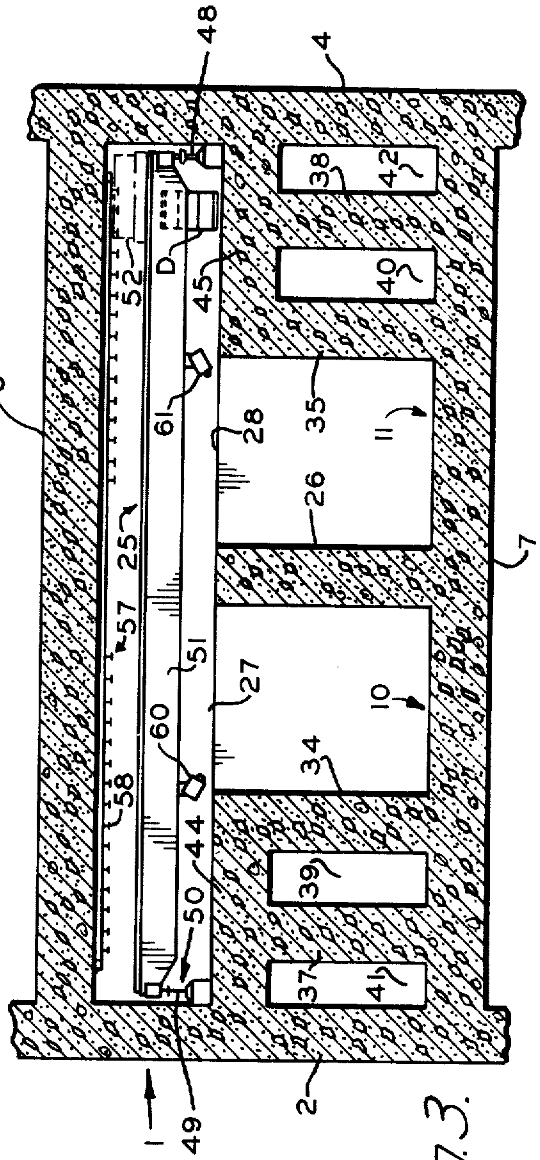
FIG. 3 is a section along line 3—3 of FIG. 1 and to the same scale.

The embodiment generally shown in FIGS. 1–3 comprises a building 1 of rectangular configuration in plan, of which building upright walls 2, 3, 4 and 5, the ceiling 6 and the floor 7 are preferably formed of poured reinforced concrete, of sufficient thickness to prevent escape of harmful radiation from the interior of the building. The building interior is subdivided into an area 8, two drumming stations 10 and 11, two storage vaults or decay pits 12 and 13, and a control station 14 in which an operator is located to operate the system by remote control.

Area 8, which is free of radioactive materials or radioactivity at all times except temporarily when radioactive materials are being shipped from the building, is shown as used for storage of non-radioactive materials such as drums D that contain no radioactive materials but may, and in this illustrative embodiment do, contain accurately weighed preloaded amounts of cement as a solidifying agent. The area 8 has in wall 2 a vehicle doorway 16 having a door 17 which may be of conventional automatically controlled type. A personnel doorway 18, having a conventional door 19, is in wall 4 near station 14.

Each drumming station 10 and 11 is equipped, as described below, with apparatus 21, operable by remote control from apparatus 23, 24 in operator control station 14, for introducing radioactive materials and water intro drum D, each preloaded with accurately determined amounts of dry cement as a solidifying agent, all in proper proportions to permit these materials after thorough mixing to form in the drum a solid body of controlled weight, and for then thoroughly mixing these ingredients.

A drum D containing the resulting mixed radioactive material, cement and water may then be stored in a storage vault 12 or 13 to permit solidification of drum contents and decay of radiation until its intensity is reduced to shipable limits. The drums are individually identified, and location of and time that each is placed in storage is recorded. After lapse of an appropriate time, the drums are moved out of the storage vault onto a vehicle V for transportaiton away from building 1 for suitable disposition. If the radiation intensity of the drum contents is initially so high that it is not reducible by storage for a permissible or reasonable time, the drum can be put into a known type of radiation shielding cask that renders the drum safe for shipment. If, on the other hand, the initial radiation intensity is sufficiently low, the drum may be shipped immediately, without storage.

Figure 4:
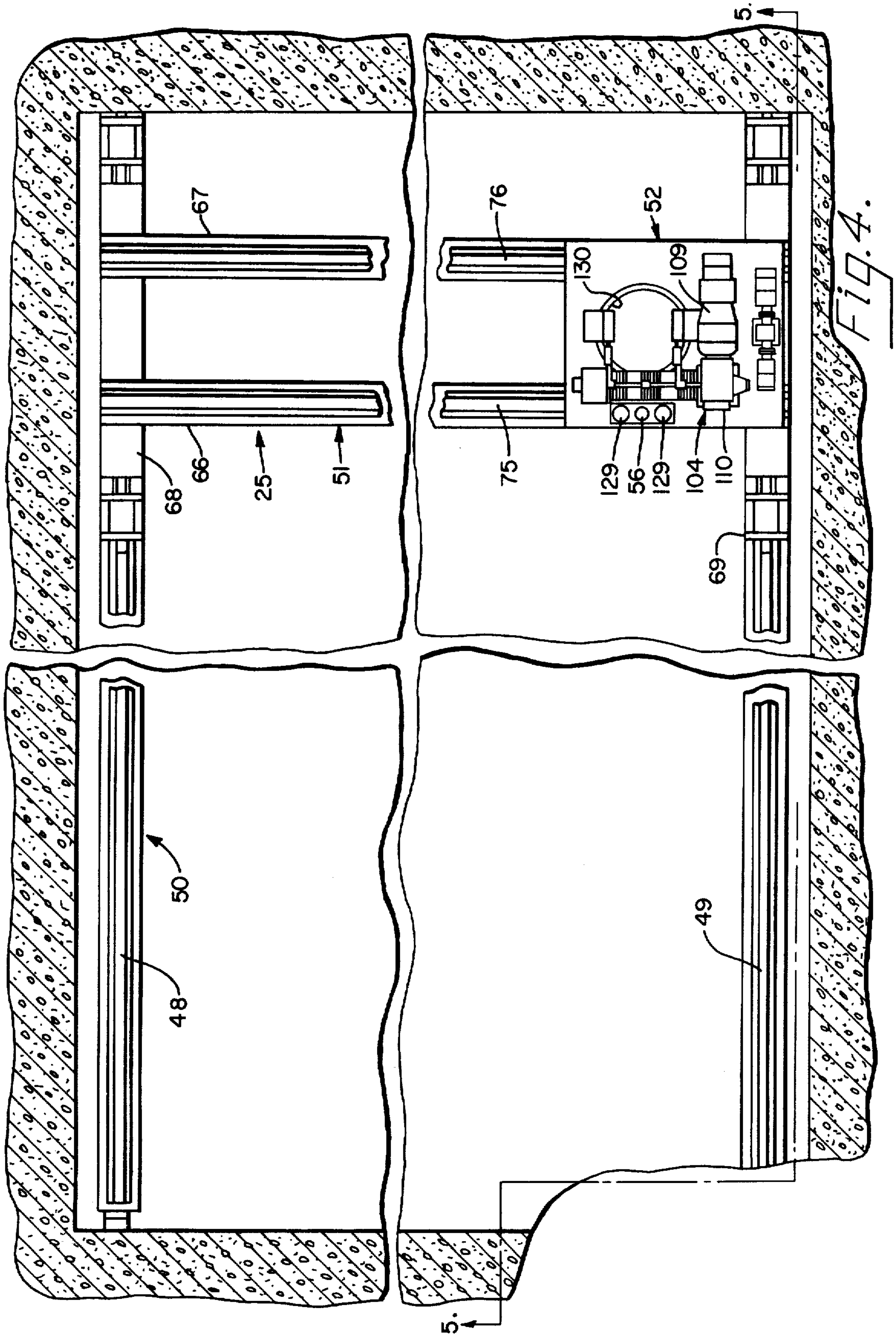
FIG. 4 is a plan section along line 4—4 of FIG. 2 and to a somewhat larger scale showing the overhead crane apparatus, the crane being in a somewhat different position than in FIG. 2.
Figure 5:
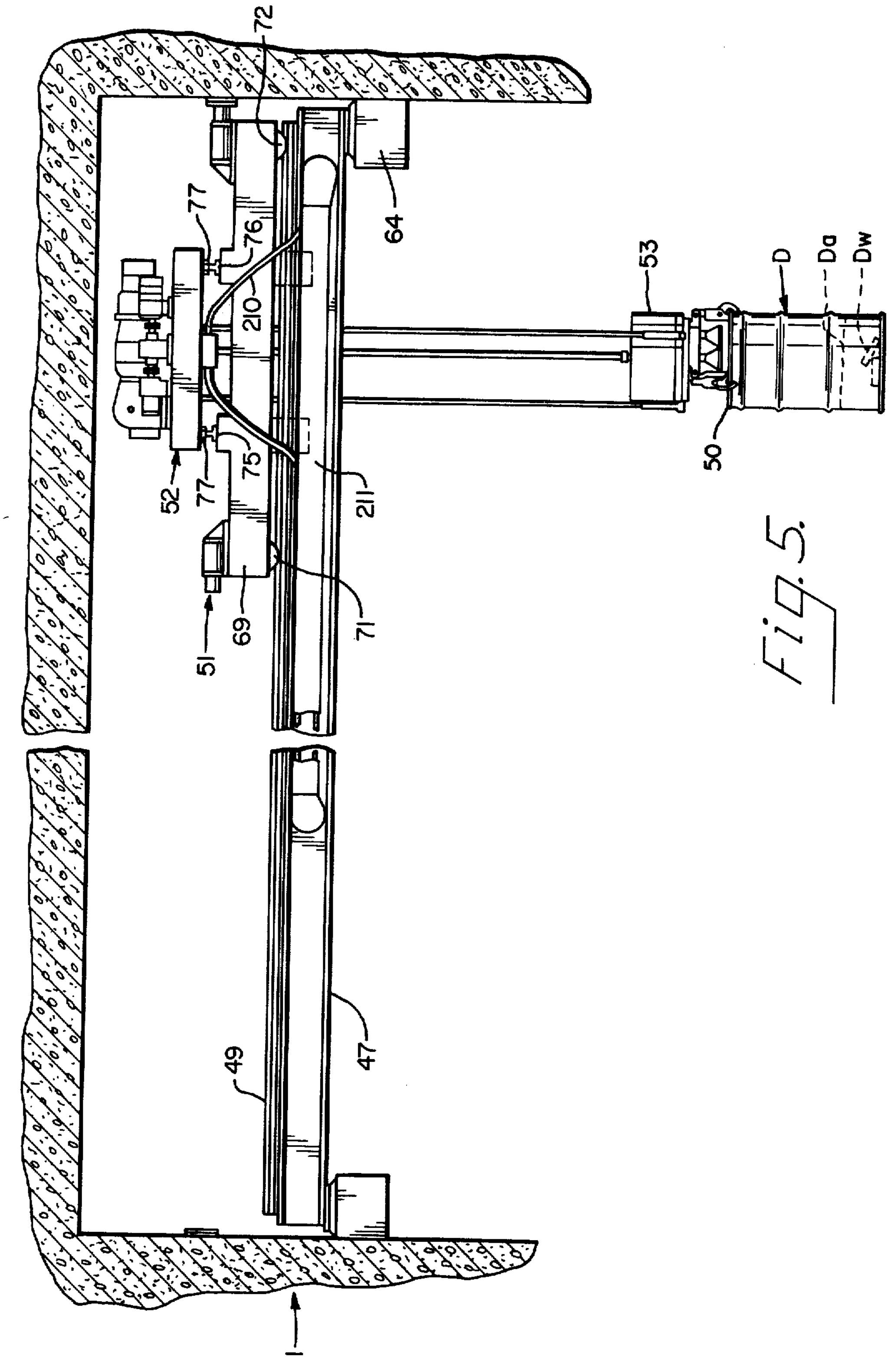
FIG. 5 is a section along line 5—5 of FIG. 4 and to the same scale showing the crane apparatus, portions of the apparatus of FIGS. 1, 2 and 3 being broken away for the sake of clearness.

A drum D is picked up from area 8, put into a selected drumming station 10 or 11 then after proper filling and mixing moved if desired into a selected storage vault 12 or 13; and when desired moved onto vehicle V by remotely controlled overhead crane apparatus 25 (FIGS. 2, 3, 4) to be described later.

These operations are performed by remote control without actual visual access, the operations being viewed through television screens and monitored by other means described below.

Building

The interior of the building 1 is subdivided (FIGS. 1, 2, 3) into the storage vaults 12 and 13 by a thick center interior wall 26 and transverse end walls 27 and 28 that are joined to wall 26 and extend into relatively close proximity to but stop short of exterior side walls 2 and 4. Transverse walls 29 and 30 longitudinally spaced from interior walls 26 and 27, and stub walls 32 and 33 joined to outer side walls 2 and 3 and spaced from transverse walls 39 and 30 set off the area 8 and station 14 from the vaults and drumming station. Spaced transverse walls 27 and 29, and 28 and 30 together with a portion of center wall 26 and longitudinally extending intermediate stub walls 34 and 35 define the drumming stations 10 and 11.

An extension of wall 35 and a short transverse wall 36 joined to it define the operator station 14.

Walls 34 and 35 together with overlapping longitudinal wall portions 37 and 38 respectively fixed to transverse walls 27 and 28 and respectively spaced from walls 2 and 34 and from walls 4 and 35, together with the transverse walls 27 and 38 and walls 32 and 33, define labyrinthian passages 39, 40, 41 and 42 that prevent lateral escape of radiation from storage vaults 12 and 13 and the drumming stations 10 and 11 into area 8 and control station 14, while permitting access to the drumming station and vaults during construction and later if necessary.

All of these walls are of sufficient thickness and formed of suitable material such as poured concrete, to prevent passage through the walls of harmful radioactive radiations.

The interior walls defining the control station, drumming stations, storage vaults and labyrinthian passages extend to locations below ceiling 6 and are suitably shaped at their tops to permit clearance for the overhead crane apparatus 24 so that it can move over and service the entire interior areas of building 1. The labyrinthian passages and the control station have roofs 44, 45 for safety and added shielding of personnel.

Crane Apparatus

The crane apparatus including a system for locating the drums is illustrated in FIGS. 2 through 5 and is described in more detail in said parent co-pending application Ser. No. 182,088.

The crane apparatus comprises a track 47 including rails 48, 49 extending lengthwise of the building, a bridge 51 that travels on the track, a trolley 52 that travels on the bridge and a grab 53, adapted to carry a drum D, that is carried by and raised and lowered and manipulated from the trolley. As described below, the grab is provided with remotely controlled means to mechanically grasp securely a drum D at its upper upstanding circumferential edge 50.

Indicating means 54 above the trolley is provided to aid the operator, by remote control from control station 14, in accurately locating and grasping a selected drum, or accurately locating and placing a selected drum, or moving it, in or out of storage area 8, a drumming station 10 or 11, or a storage vault 12 or 13.

The indicating means, to be described below, has on it indicia 55 (FIGS. 2, 3) marked, as by number and letter combinations, that can be viewed and identified by an upwardly directed television camera 56 (FIG. 4) on the trolley that transmits an image to a television monitor screen 57 in control station 14. By suitable movement of the bridge and the trolley on the bridge the trolley can be moved to and accurately located over a desired location for a drum by scanning through the television camera to find a desired indication on the ceiling, the camera preferably having cross hairs or other markings to aid location as described later.

The grab will also be provided with a downwardly facing television camera that can focus on the center of the drum. Preferably this camera has on it markings that, when the grab carrying the camera is lowered a suitable distance, coincide with markings or structural features on a selected drum to indicate the height of the grab relative to the drum on a second television monitor screen located in control station 14. By this means, the grab can be accurately located over the proper drum at the proper height, after which the grab can be actuated to grasp and lift the drum; and the grab while carrying a drum can be located in a proper location to place the drum.

For adjustable surveillance television cameras 60, 61 (FIGS. 3, 4) are mounted on the bridge 51 at suitable locations so they can scan downwardly to view other locations; these cameras can respectively show their viewed scenes on monitor screens 62, 63 in station 14 (FIG. 1).

The track rails 48, 49 are supported from brackets 64 extending from the walls of the building; the rails extend substantially throughout the length of the building so that the grab 53 carried by the trolley, by suitable manipulation of the bridge and trolley can service substantially the entire internal area of the building between the rails. Suitable control means, which may be of known type, are provided in the control station 14 at the monitor screens so that the crane and grab can be operated by an operator at that station.

The interior of the building is designed to provide a radiation-free area at one end in which maintenance work may be carried out on the crane. Such area is protected by shield walls from radiation from radioactive materials in the storage vaults 12, 13 or in drumming stations 10, 11; area 8 may be used for such purpose in the illustrated embodiment.

Bridge 51 comprises beams 66, 67 fixed at each end to carriage structures 68 and 69 each having flanged wheels 71 and 72 that travel on one of the rails of the track. In each carriage structure one of the wheels is power driven as described later to move the bridge along the track as desired. The bridge beams carry spaced parallel rails 75, 76.

At each side, the trolley 52 has two wheels that travel on these rails 75 and 76. One set of wheels freely rotatable; the wheels 77 of the other set are power-driven by electrically energizable drive means on the trolley, that is controlled by suitable known means from the control station 14 as described in more detail in said parent co-pending application Ser. No. 182,088.

Drumming Station: General Arrangement of Drumming Station

Each drumming station (FIGS. 1, 2, 6–9) has substantially identical apparatus; for convenience only the apparatus in drumming station 10 will be described, it being understood that the apparatus in the other drumming station is identical except for situations where parts may be of the other hand for convenience in installation or operation. Corresponding parts will have identical reference characters in both drumming stations.

The apparatus in each drumming station comprises substantially the same four basic components: a metal shield wall 214, drumming equipment 215, a decanting tank 216 and a set of metering pumps 217*a, b, c*. While the relative positions of these components could be changed the basic function of each remains the same, so the drumming station apparatus can be installed in a right or left hand arrangement, if such positioning is required or desired.

Shield Wall

The shield wall 214 serves as a locating and anchoring means for the other components 215, 216, 217*a, b, c*. It is formed of strong metal to support the other components and to serve as a barrier to stop the escape of harmful radiation from the side of the shield wall carrying these components, to the other side. The shield wall may be of any of various thicknesses, depending on the intensity of radiation expected to be encountered; since it is formed of metal its thickness is substantially less than conventional shielding such as concrete; moreover the faces of the shield wall may be machined, drilled and bored to present accurate surfaces for equipment mounting and uniform smooth surfaces for cleaning if required. Use of the metallic shield wall and its resulting lesser thickness simplifies drive connections and maintenance work done through the shield wall. A shield wall of steel approximately 12 inches thick is advantageous for most uses of the invention.

The shield wall is rigidly but demountably attached to the concrete building wall 29 or 30 by an accurately machined, grounted in frame 218 (FIGS. 7, 8) surrounding wall opening 219 to which the shield wall is secured by bolts and nuts 220 on the safe side of the shield wall. Preferably, the shield wall has a supporting eye 221 at its top. Therefore, the shield wall can be demounted with the other components still attached, and bodily removed as by an overhead crane to a remote location for maintenance or repair; the cantilever mounting of the components mounted on the shield wall, as described below, facilitates this; the cantilever supporting of components also eliminates floor supports and facilitates cleaning. The shield wall preferably overlaps the opening 219 to provide an offset joint that prevents possible radiation leakage around the shield wall edges.

Figure 7:
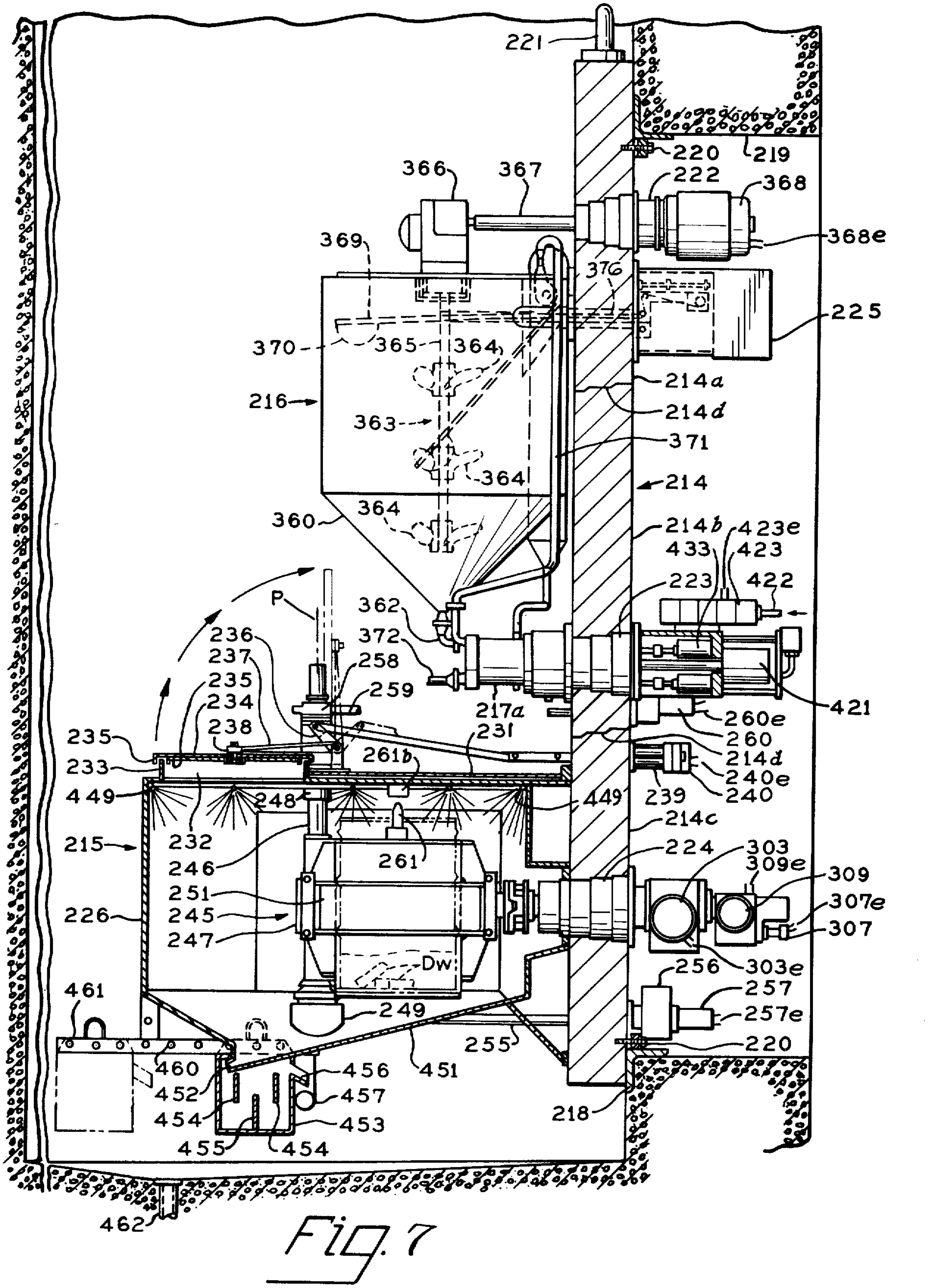
FIG. 7 is a side view of the drumming apparatus, parts being broken away to show the interior mechanism in the housing.

The shield wall may be divided into sections 214*a*, 214*b*, 214*c*, by transverse joints 214*d* to facilitate easier handling and shipping. These joints are offset or stepped as shown in FIG. 7 to prevent radiation leakage outwardly to the safe side of the shield wall outside of the drumming station. As explained later, parts such as drives that pass through the shield wall are also sealed to removable plugs, as at 222, 223, 224 that form similar offset or stepped joints to prevent radiation leakage. Where space or design does not permit sealing to an offset or stepped plug, a secondary shield 225 is provided to block radiation escape.

Drumming Equipment

The drumming equipment 215 illustrated comprises a closed housing 226 supported from the side of the shield wall facing into the drumming station. This housing (FIGS. 6–9) has upstanding sides 227, 228 carrying detachably mounted access plates 229. The top 231 of the housing has a hatch opening 232 surrounded by upward flange 233, closed by a hinged hatch cover 234 having inner and outer downward flanges 235 that overlap flange 233 in the closed position to prevent escape of radioactive material. The housing and hatch cover when closed provide a closed enclosure in which drum loading and mixing occurs. The hatch cover permits access to the enclosure for introduction or removal of drums, while preventing escape into the drum, and while preventing escape of radioactive material due to splashing should the drum being processed develop a leak or should material be accidentally spilled during the loading operation. Hatch cover 234 can be moved to closed and open positions by a lever 236 pivotally supported on housing 226 and is rigidly secured to an arm 237 carrying the hatch cover through a resilient connection 238. Lever 236 is actuated from the safe side of the shield wall by a known fluid-operated cylinder 239, the fluid valves 240 of which are controlled by known means 240*e* from the control station 14. The cylinder is spring loaded to close the hatch if the energizing fluid fails, for safety; the spring load can be overridden by hand or by mechanical means. Housing 226 has a venting conduit 226a preferably connected to a closed venting system.

A fixed loading dock 241 is externally mounted at one side of the housing 226 and is adapted to support a drum to be filled that is first deposited by the crane on this dock. A fixed unloading dock 242 is externally mounted on the other side of housing 226; a drum removed from housing 226 is set by the crane on this unloading dock, and the intensity of radiation emanating from the drum is measured by known radiation monitor means 243 that sends by known means 243e electrical signals to the control station 14 where the information is noted. Each of the loading and unloading docks carries a scale 244 connected with known means for reporting the scale reading to the control station. The scales are adapted to be removed from and placed on their supporting stations by the grab, so if necessary the scales can be serviced in a radiation free area.

Inside of drumming equipment 215 is a drum positioner cradle mechanism 245 (FIGS. 7, 10, 11) adapted to carry a drum and move it (FIG. 8) about a vertical axis P from a drum loading and unloading position "I", then to a first intermediate position "II" in which the drum is clamped into its cradle in a vertical position, then to a second intermediate position "III" in which the drum is opened by unscrewing and removing its cap, then to a third intermediate position "IV" where the drum is filled the back to intermediate position "III" in which the drum is closed or capped, then to intermediate position "II" where the drum is turned end-over-end to agitate and mix its contents, from which position the cradle returns the drum to location "I" under the hatch from where the drum can be removed by grab 53. The cradle mechanism comprises a vertical shaft 246 (FIGS. 6–8, 10) on which a cradle frame 247 is rigidly mounted; the shaft is rotatably and vertically slidably mounted in bearings 248, 249 mounted at the top and bottom of housing 226. A cradle 251 rotatably supported in the cradle frame by bearings in two spaced hub portions 252, 253 of the cradle frame for rotation about a horizontal axis H on its cradle frame which thus forms a trunnion in which the cradle can be rotated to impart to the drum the desired end-over-end motion to thoroughly mix the contents of the drum, tumbling movement of the loose mixing weights Dw (FIGS. 4, 7) in the drum aiding this mixing.

The cradle frame 247 is moved to angular positions I, II, III, IV indicated above by actuating means (FIGS. 6,7) comprising a lever arm 254 rigidly mounted on the lower end of shaft 246 and pivotally connected to a rod 255 that may be reciprocated as required by a known mechanism 256 driven from an electric motor 257 energization of which is controlled by known means **257*e* from control station 14. The linear travel provided by mechanism 256** may be controlled by known means accurately to stop the cradle in the various angular positions as described above.

The cradle frame 247, its supporting shaft 246 and cradle 251 carrying a drum can be raised and lowered as required to permit movement of the cradle and performance of necessary steps in the positions I–IV, by a known type of screw jack mechanism 258 (FIGS. 6, 7, 8) actuated by a drive shaft 259 extending through the shield wall to its safe side. Shaft 259 is rotated as required by a gear box electric motor combination 260, controlled by known means 260e from the control station to raise the cradle to an upper elevation referred hereafter as the "U" elevation in positions III and IV, and to lower the cradle to a lower elevation hereinafter referred to as the "L" elevation for movement between the positions and for operating in positions I and II.

When the cradle frame 247 is raised to elevation U in either of positions III or IV, an upwardly projecting tapered dowel pin 261 (FIGS. 7, 10, 12) fixed to the top of the cradle frame engages in the opening **261*a* of the appropriate one of two hardened steel bushings 261*b* in the top wall 231 of the housing 226.** This assures accurate and positive location of the cradle in positions III and IV for the filling and capping operations that are carried out in these positions.

When the cradle frame 247 is in any of positions I, III, IV, cradle 251 can be held in a vertical position in the cradle frame by a latch member 262 (FIG. 10) pivotally mounted on the cradle frame and biased by compression spring 263 to latching position where the beveled free end 264 of member 262 engages between a pair of spaced lugs 265 on the cradle. The latch member can be released from the cradle by the tapered end 266 of a pin 267 that extends through the shield wall and is adapted to be axially inserted into a flare-mouthed socket 268 on the cradle to a depth sufficient to contact and release the latch member. When pin 267 is so inserted, it secures frame 247 against angular or other movement while the cradle is being rotated about its horizontal axis H to agitate the contents of the drum. After such cradle rotation has ceased and the cradle has been properly located with the drum vertical and its cap side up by suitable known means such as conventional electrical interlocking means, pin 267 is withdrawn from socket 268, and latch member 262 by the force of spring 263 re-engages the cradle to lock it in the vertical position with respect to its frame 247. Pin 267 is moved axially as required by a double acting fluid energized cylinder 269 having control valves that are actuated in a known manner from control station 14 by known electrical means.

Cylinder 269 is equipped with limit switches **270*a* and 270*b*, operated by stop 270*c* on the cylinder rod to interlock through suitable conventional circuit means to prevent starting of the below described means for rotating the cradle while the latch member 262** engages the cradle.

Figures 10, 11:
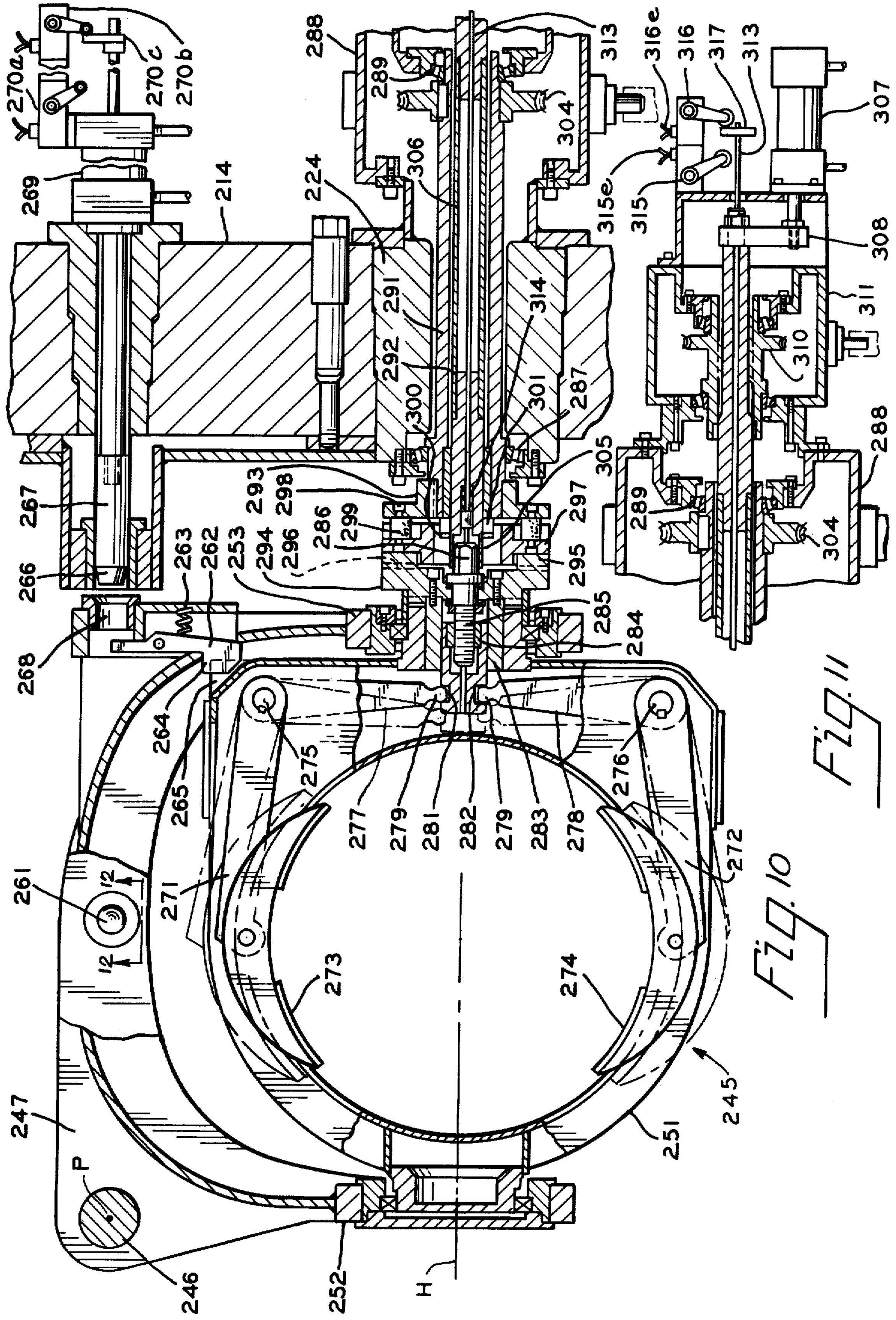
FIGS. 10 and 11 shown to an enlarged scale and in plan the cradle frame and cradle, as well as associated apparatus for holding the drum in the drumming apparatus.

The drum may be centered and firmly clamped in its cradle 251 by clamping means as shown in FIGS. 10 and 11. Two opposing clamping arms 271 and 272 pivotally carry clamping members 273, 274 and are rigidly mounted on shafts 275, 276 pivotally mounted in the cradle about axes parallel to the drum axis. These shafts rigidly carry arms 277, 278 having rounded outer ends 279 that ride in an external groove 281 of a member 282 that is axially slidably mounted in hub portion 283 of the cradle in hub portion 253 of the cradle frame nearest the shield wall when the cradle frame is in position II-L. When member 282 moves axially away from the drum carried by the cradle, the clamping arms 271, 272 move toward the drum and their clamping members firmly engage the drum. When the member 282 moves toward the drum, the clamping members release the drum.

Member 282 is so moved by engagement of an internally threaded nut 284 rigidly mounted in member 282 with an externally threaded screw 285 rotatably but axially immovably mounted on hub portion 283 of cradle 251. Screw 285 has a projecting end 286 that has a polygonal preferably hexagonal cross section. When, as will be described later, this polygonal end portion is engaged and rotated relative to the cradle, member 282 will move axially and, depending on its direction of rotation, will clamp or unclamp the drum.

The clamping means of the cradle is actuated, and the cradle itself may be rotated, provided that latch member 262 is released, by the means shown in FIGS. 10 and 11 which comprises stepped plug 224 that fits through the shield wall and carries at the drumming station side an internal bearing 287 and its other side a removable gear box 288 carrying another bearing 289. These bearings carry an elongated member 291 for rotation about an axis that is coaxial with the axis H of the cradle when the cradle is in drum rotating position II. Member 291 has an axial opening 292. On the drumming station side, member 291 carries a driving coupling portion 293 adapted to engage and drive a driven coupling portion 294 on hub portion 283 of the cradle when the cradle is in position II.

Driven coupling portion 294 has axial and radial dogs 295 adapted to fit loosely in corresponding slots 296 of an intermediate coupling member 297 that is flexibly mounted, as by bolts 298 threaded onto rubber amounts 299 on driving coupling portion 293. Intermediate member 297 on its side away from portion 293 has slots 300 alternating with and spaced 90° angularly from its slots 296. Driving coupling portion 293 has radial and axial dogs 301 that can loosely fit in slots 300. The driving coupling member 297 thus flexibly mounted so it is capable of substantial but limited lateral movement, so the driven coupling member can engage and so the cradle can be rotated even if there is substantial misalignment of the two coupling portions 293 and 294. By suitable means of known type, the dogs 295 of driven cradle coupling portion 294 and the slots 296 of intermediate member 297 flexibly mounted on driving portion 293 will always be positioned to extend horizontally when the cradle is not rotating so that these dogs and slots can mate and engage when the cradle is swung into position II-L and to readily disengage when the cradle is moved out of such position. The power means for rotating the cradle when it is in position II-L is electric motor 303 (FIG. 7) controlled by known means 303*e* from control station 14, that is adapted to rotate member 291 through suitable gears 304 in gear box 288.

The hexagonal portion 286 for actuating the clamping arms can be engaged by a socket 305 mounted on a shaft 306 that is rotatably and axially movable in member 291. Shaft 306 is moved axially as required by a double acting fluid operated cylinder 307 connected through bracket 308 to the end of the shaft on the safe side of the shield wall and controlled by conventional means 307*e* from station 14. After its socket is engaged with polygonal end portion 286, the shaft is rotated as required to clamp or unclamp the drum, by an electric motor 309 (FIG. 7) that rotates the shaft through suitable gears 310 in gearbox 311; motor 309 is controlled from station 14 by suitable known means 309*e*. Means for insuring that the cradle comprises a feeler rod 313 slidably coaxially mounted in shaft 306 and biased toward hexagonal portion 386 by spring 314, and limit switches 315, 316 adapted to be actuated by a stop 317 on the other end of the rod as it moves. When the rod is retracted sufficiently because of sufficient clamping travel of screw 285, the limit switches through suitable conventional interlocking circuit means 315*e*, 316*e* permit rotation of the cradle; otherwise they do not.

The drumming station also includes cap handling means 320 for removing and replacing screw cap 321 in the top of a drum, (FIGS. 9, 13–15). After the drum is at position III for cap removal, the cradle frame 247 is raised to elevation U to raise the drum D carried by the cradle 251 so its cap 321 can be engaged by means 320.

When brought into the drumming station according to the illustratative process, each drum will contain a preloaded accurately determined amount of cement or other solidifying agent Da and one or more freely movable mixing weights Dw (FIGS. 4, 7) which may take the form of oblong pieces of steel about 1½ inches × 1½ inches × 6 inches in dimensions; a cap 321 closes the drum.

The drum, which is of generally cylindrical form, has (FIG. 13) a cap opening structure C at the center of the top wall 322 of the drum, comprising a steel collar 323 having an internal threaded opening 324, fixed in the top wall 322 of the drum. Collar 323 has a radial flange 325 around the outer edge of which the top wall metal is crimped at 326 to hold the collar securely in the drum; preferably a sealing ring 327 is clamped between the drum metal and the flange 325 to provide a fluid-tight seal between the collar and the drum. The internally threaded opening 324 is adapted to be closed by cap 321 that has an external thread that permits the cap to be screwed into the threaded opening. The cap has a central depression 328 of circular cross section with vertical serrations or other suitable gripping surface, and an outward radial flange 329; cap 321 also carries a sealing ring 330 that forms a fluid-tight seal between the cap and the drum.

Cap handling means 320 comprises frame structure 331 rigidly mounted on housing 226, and a wrench 332 rotatably and axially movably supported on the structure 331 to grasp and remove and replace cap 321. The wrench is a resilient expandable slotted collet that is resiliently biased to contract and has an outer surface shaped to fit inside depression 328 of the cap so that when the collet is expanded it firmly grasps the inner wall of the depression. The wrench is expanded by a pull rod 333 having an externally conical expanding portion 324 that bears against a matching internally conical surface 335 in the wrench, so that when the pull rod is drawn upwardly it expands the wrench to grasp the cap.

The pull rod is drawn upwardly and moved downwardly as required by a cam 336 (FIGS. 14, 15) that is rotated about its horizontal axis to lift and lower a follower 337 that is slidably mounted on frame structure 331, and supports the pull rod for rotatable but no relative axial movement. The cam is connected to and rotated (FIGS. 8, 9, 13) by a shaft 338 that extends through shield wall 215 to a gearbox and electric motor unit 339 the motor being controllable by conventional means 339*e* from the station 14. The cam is shaped to provide a predetermined amount of tension on the pull rod and collet wrench 332 to permit the cap to be gripped with adequate force to hold it securely for removal, but not to deform it. When the cam 336 is turned so it moves the cam follower down, rod 333 is lowered, thus moving its conical portion 334 downwardly of the collet wrench and allowing the wrench to contract to release the cap.

While the wrench is engaged in the cap, the cap is rotated by the cap handling means 320 to unscrew the cap to open the drum, and after the radioactive material has been placed in the drum to screw the cap in the drum to close it. For this purpose a hollow shaft 341 surrounds and is coaxial with the wrench pull rod and is adapted to support and rotate wrench 322. It is supported from frame structure 331 for rotational and axial movement correlated with the pitch of the threads of cap 321 and opening 324. The shaft 341 is rotated by a worm gear 342 that drives a worm wheel 343 rotatably but axially immovably supported from frame 331. It is rotated (FIGS. 9, 13, 15) as required by a shaft 344 extending through the shield wall to a gearbox and electric motor unit 345 controlled from station 14 by means 345*e*.

Shaft 341 is slidably but non-rotatably connected to worm gear 343 and has projecting dogs 346 at its lower end that engage shoulders 347 on the wrench 332 to rotate it when shaft 341 is rotated. Vertical travel of the wrench shaft and wrench are correlated with axial movement of the cap as it screws in or out by a nut 348 rigidly carried by frame 331 engaging a lead screw 349 fixed to shaft 341, the nut and lead screw having threads of the same linear pitch as the thread on the drum and cap, so as to retain exact relationship between threads in the drum and on the cap to facilitate recapping without crossthreading. The cap handling means is so designed that cam 336 maintains and holds tension on the pull rod that causes the wrench to grasp and firmly hold the cap during the removal of the cap and in the interim period while the drum is being filled. Sensing means 350 embodying spring loaded feeler 350*a* and limit switch 350b senses when the drum is in the proper position to have the cap removed or inserted, and through interlock means permits the apparatus 320 to operate; otherwise it prevents operation.

After the cap has been removed at position III the drum is ready to have the radioactive material put in it. This is accomplished by locating the drum carrying cradle 251 in the filling position IV and lifting the cradle and drum to engage the opening 324 with the fill nozzle 351 in the top wall 231 of housing 226. Nozzle 351 is fixed to the top wall 231 and has a nozzle portion 353 with a tapered lower end adapted to project through opening 324 into the drum D, and also has several downwardly through openings for introduction into the drum of radioactive resin dispersion from the decanting tank. Said openings in the nozzle will be respectively connected to a decanting tank and to a source of evaporator bottoms through the metering pumps.

Decanting Tank

Decanting tank 216 (FIGS. 6, 7, 16) is a closed tank formed of corrosion resistant durable metal, such as stainless steel, and is cantilever supported from shield wall 214. The tank has a frusto-conical lower portion 360 to aid in emptying material from the tank. A dispersion or slurry of radioactive resin particles in water is supplied to the tank from a suitable source such as a pipe 361 connected to a plant holding tank, by pump **217*b* connected to pipe 362 opening into the bottom of tank 216. The decanting tank has an internal mixer 363 for stirring the material in the tank when desired. That shown comprises three propellers 364 mounted on a common shaft 365 rotatable about a vertical axis aligned with the central axis of the tank. This shaft is rotated through a gearbox 366 by a drive shaft 367 extending through the shield wall from an electric drive motor 368 on the safe side of the shield wall. As desired the motor can be energized and controlled from control station 14 by conventional means 368e to cause propellers 364** to mix thoroughly the material in the tank, regardless of the level of materials in the tank.

Tank 216 also has means for providing an adequate supply to the drumming station of a mixture of radioactive containing resin and water in a predetermined proportion. In general, the slurry supplied to the decanting tank contains excess water; and the decanting tank includes means for removing excess water by decanting.

A dewatering or decanting pipe 369 is pivotally mounted in the tank at its inner end by a leakproof joint. The outer end of the pipe carries a float 370 so that the end of the pipe can rise and fall with the liquid level. A conduit 371 connects the inner end of pipe 369 to one of the metering pumps **217*a* the outlet of which is connected by pipe 372 through a fine strainer 373, such as 100 microns, to an outlet pipe system 374** forming part of a plant equipment drain system.

The levels of the water and of the radioactive resin particles in the decanting tank 216 are sensed by sensors 375, 376 that transmit electrical signals giving information as to levels to the control station 14. Both sensors are identical except for the specific gravities of their floats.

Float **383*b* may have a specific gravity of about 0.5 and is used to determine the level of the surface of the water in tank 216.**

Float **383*a*** has a specific gravity of approximately 1.05 so that it will sink in the water but will float at the surface of the resin in the tank.

Both sensors operate in essentially identical manner, except that the float of which one has a specific gravity such that it detects and senses the level of water, while the other senses the level of the resin particles after they settle.

The operator at control station 14 can therefore determine, as from a predetermined curve or chart, the amount of water that should be left with the resin to provide the desired proportion or radioactive resin particles to the water. He can then actuate metering pump **217*a* to remove excess water through the floating end of decanting pipe 369, conduit 371, pump 217*a*, strainer 373 and conduit 374 until the desired level is reached, as indicated by the sensors 375, 376** to provide a dispersion in the tank of the desired predetermined proportion of water to resin particles.

Figure 8:
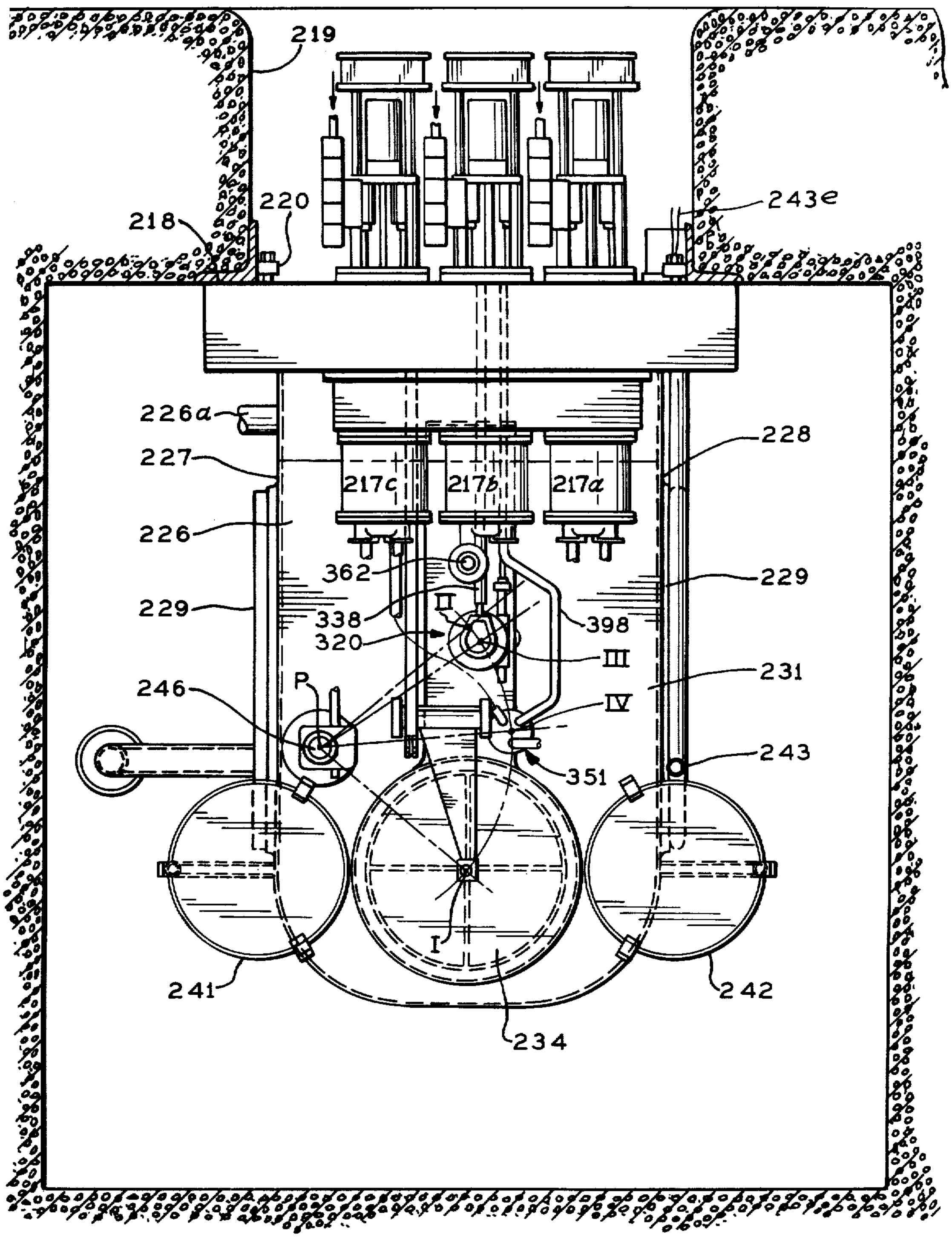
FIG. 8 is a plan view along line 8—8 of FIG. 6 and to a somewhat larger scale, parts, mostly piping, being omitted for the sake of clearness.

After the proper proportion has been achieved, a proper amount of the dispersion can be caused to pass through conduit 362 from the bottom of tank 216 through metering pump **217*b* and conduit 398 to port 354*a* of filler nozzle 351 into a drum D (FIGS. 7,8**).

Preferably, spray heads 399 (FIG. 6) are provided inside of the decanting tank to spray clear water to cleanse the floats **393*a* and 383*b* when they are lifted to their highest elevations; their valves can be controlled by suitable means, as from proximity switches 394.**

Metering Pump

Figure 6:
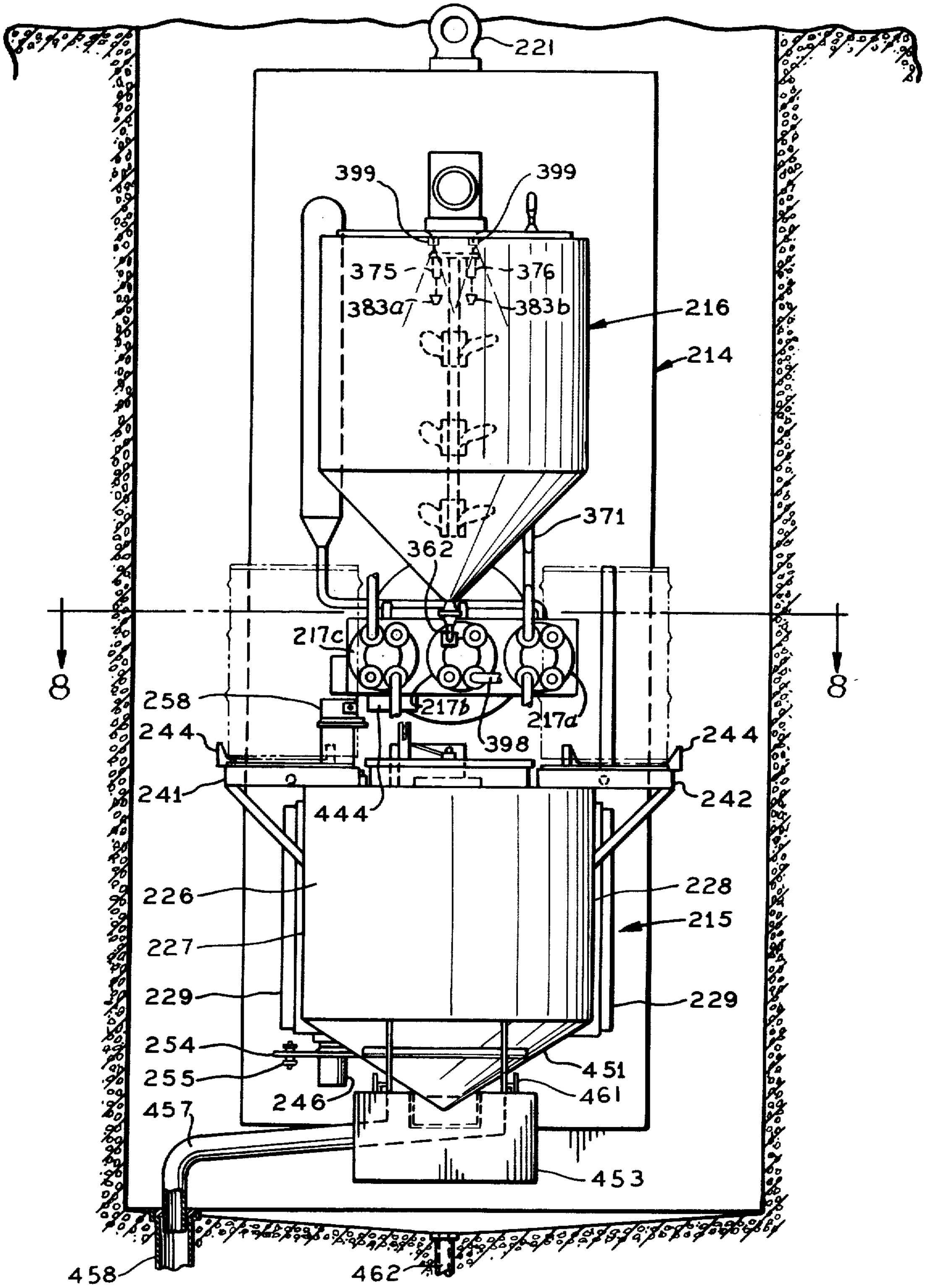
FIG. 6 is a view of drumming apparatus in the drumming station, from line 6—6 of FIG. 1 and to a scale considerably larger than that of FIG. 1.

While a pump of any of various types may be employed to pump the dispersion of radioactive particles in water from the decanting tank 216 through filler nozzle 351 unto the drum D, the pump 217 of FIGS. 6–8 is exceptionally advantageous. It delivers accurately measured quantities of liquid and thus makes possible accurate remote control of the amount of liquid passed from the decanting tank into the drum. It also makes possible the pumping of clean water for disrupting sedimentation of the particles in the tank or conduits, the use of clean water for sealing purposes, and has safety features in making possible maintenance of the pump from the safe side of the shield wall 214. The metering pumps **217*a*, 217*b*, and 217*c* and the decanting tank 216** are described in detail in said parent co-pending application Ser. No. 182,088.

Drumming Station Cleaning System

Spray heads 449 (FIG. 7) connected to clean water source 440 and controlled from station 14, are provided inside of drumming equipment enclosure 226 to wash down the walls and equipment in the enclosure if desired. The spray water used flushes down the sloped bottom 451 of enclosure 226 and drains out through a bottom opening 452 into a sump tank 453 (FIGS. 6, 7, 9). This sump tank has internal baffles 454, 455 to provide a settling tank for fines that might be in the flush water, thus trapping solids that might be radioactive and that otherwise could contaminate downstream equipment if they entered a plant drain system. Excess water free of fines flows out through an overflow gate 456 into a drainage spout 457 discharging into a drain 458 located in the drumming station floor and connected to plant equipment drain system 459 that if desired may discharge into the system for producing evaporator bottoms. The sump tank is so designed that it can be moved laterally on rollers 460 on a track 461 to a location where it can be removed by the crane. It can be placed by the crane for disposal into a drum, having a completely removable top, which to can be replaced after the sump tank and its radioactive contents, water and cement or other solidifying agent if desired, are placed in the drum.

Another drain in each drumming station floor forms part of a plant floor drain system 462 to remove liquids or wastes that may have collected on the floor, as from drum leakage or washdown of the drumming station.

Figure 16:
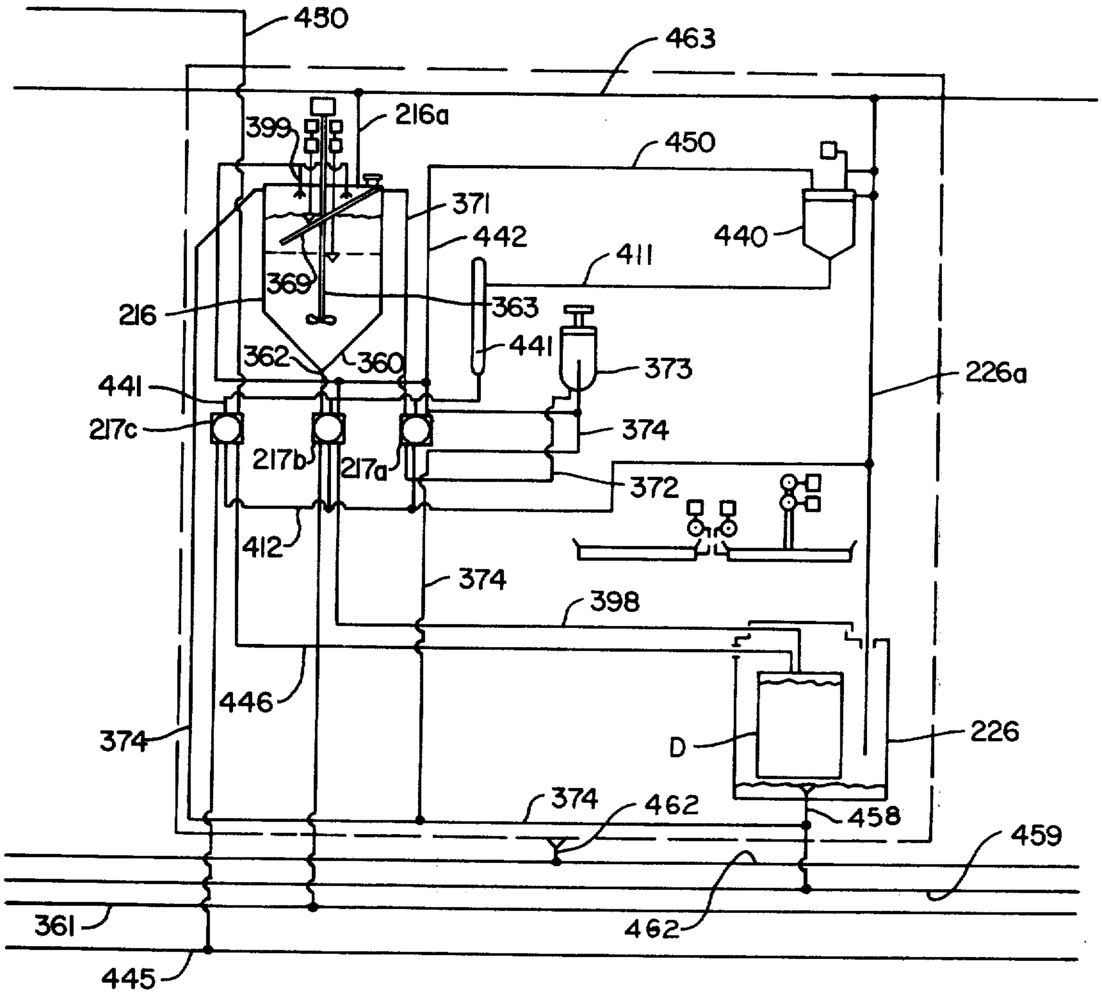
FIG. 16 is a schematic piping diagram for a drumming station.

The conduit system of FIG. 16 is shown for a single drumming station, but it can be duplicated. In such case lines 361, 445, 450, 459, 462 and 463 as well as other lines, can be common to two or more drumming stations.

As disclosed above, the illustrative embodiment has separate piping for each type of radioactive waste to and in the drumming station equipment, for safety and continuity of operation. The drumming apparatus 215 is completely enclosed and sealed to allow no escape of liquids, solids or gasses except through conduits planned and provided for such purposes. Thus, a vent system 463 removes and cleanses by known means, air or gases from decanting tank 216 through vent conduit 216*a*, and from drumming housing 226 through vent conduit 226*a*, as well as from other locations. the interior of housing 226, and the equipment in it, can be washed down by remotely controlled spray heads 449 for decontamination purposes if necessary.

Materials such as radioactive-containing solids washed out of the housing 226 are removed in the described removable sump by remote control. The above disclosed filling means is also designed to eliminate the possibility of radioactive waste material being spilled on the exterior of the apparatus of the drumming station by error or accident.

As disclosed, two separate and independent means are used to determine the amount of material in the drum and to prevent overfill; one means comprises metering pumps that pump accurately determined amounts of fluids into the drums; the other means comprises the liquid level sensing system indicated.

In the illustrative apparatus and process, the solidifying agent, cement for example, and mixing weights are placed in the drums before they enter the system, and the drums are immediately sealed. Each drum remains sealed until the drum is opened in the drumming station immediately prior to introduction of radioactive material, after which the drum is immediately closed. This prevents entrance into the drum of undesired moisture or other contaminants that could harmfully affect the solidifying agent or other materials in the drum.

Operation of Drumming Station

A typical cycle of operations of the drumming station is as follows, assuming that the cradle frame 247 is located so its cradle 251 is properly located in position I under the hatch cover 234, the cradle being locked by latch 262 in the cradle frame to receive a drum in the vertical position; the hatch cover 234 is open; and a capped drum D containing cement and mixing weights Dw is on the loading dock 241 of the drumming station to be operated as shown in broken lines in FIG. 6. The operator in control station 14 then controls the overhead crane 25 and its drum grab 53 to pick up the drum from the loading dock and load it into the cradle. The operator then causes the hatch cover to close and the cradle frame 247 to move to position II. The clamping members 271, 272 are then actuated by engaging socket 305 on shaft 306 with polygonal clamp actuating portion 286 of the cradle and rotating the shaft as described above, to clamp the drum. The socket 305 is then disengaged and the cradle frame angularly moved to locate the drum at position III for cap removal. The cradle frame is then raised to cause its pin 261 to enter the socket 261*a* for position III, and to raise the drum so its cap 231 can be engaged by the wrench 332 of cap handling means 320, which is then caused to operate to remove the drum cap. The cradle frame 247 is then lowered, and moved angularly to the drum filling position IV.

The cradle frame is here raised to cause its pin 261 to enter the socket 261*a* for position III, and to raise the drum so the fill nozzle 351 extends into the drum. The filling cycle is then carried out as described previously by supplying a metered amount of a dispersion of radioactive particles in water from decanting tank 216 or from evaporator bottoms supply line 445.

After the proper predetermined amount of the dispersion of radioactive particles in the proper proportion of water has been put into the drum, the cradle frame is then lowered and moved angularly to the capping position III where the cradle frame will again raise the drum so it is in capping relation to the cap handling means 320 the wrench of which is still holding the cap in a position so that when rotated the cap moves downwardly and engages the threads in the drum. The cap is then reinserted and screwed tight as described above. The wrench of the cap handling means is then released and the cradle frame lowered.

The cradle frame is next moved to position II to locate the closed drum for mixing. As the cradle frame moves into position II, the clutch portions 293 and 294 engage as described above. The tapered pin 267 is pushed in to secure the cradle frame against movement and to release the cradle for rotation. The drive motor 303 for rotating the cradle is then started and the drum is rotated end-over-end about axis H to mix the drum contents thoroughly, the freely movable mixing weights Dw in the drum greatly aiding thorough mixing. During the latter part of the mixing cycle, the drum may be washed as it is rotating by water sprayed from heads 449 so that drum and the interior of the drum housing 226 can be thoroughly washed down. When the mixing cycle has been completed, the mixer stops with the drum in an upright vertical position as described. Socket 305 on shaft 306 is then engaged with polygonal end portion 286 of the clamp mechanism on the cradle, and shaft 306 is rotated to unclamp the drum in the cradle. After the drum is unclamped and shaft 306 is retracted, pin 267 is also retracted to secure the cradle to the cradle frame with the drum in its upright vertical position and to release the cradle frame from the housing so that it may be angularly moved to position I for unloading.

Hatch cover 234 is then opened and drum grab 55 lowered through the hatch into the housing 226 to pick up the drum. The drum is then placed on the unloading dock 242 where its weight is checked by scale 244 and its radiation level is monitored by monitor 243 and the information transmitted electrically to control station 14 for recording.

The operator places another drum with its predetermined quantity of dry cement on the loading dock 241 as shown in FIG. 6 while the drum being filled is in housing 226 in its filling cycle. The scale 244 on the loading dock is used to verify the cement quantity in the drum, and the drumming apparatus is ready for the next cycle.

After the operator loads the next drum into the cradle and starts the drumming cycle, he then places the processed drum in one of the decay vaults 12, 13 for storage and brings another drum into position on the loading dock. Modifications may be made in this illustrative process of operations.

Control Station

Equipment in the control station 14 is described in detail in said parent co-pending application Ser. No. 182,088.

The control station includes a control console 23 at which the operator will sit and from which he can control the operation of the apparatus by remote control. The control station also includes unit 24 spaced rearwardly from the control console and containing other apparatus and the television monitor screens 57, 59, 62 and 63 (FIG. 1), so that they are at a distance from the operator to avoid eyestrain.

As indicated previously, screen 57 is connected to the television camera 56 on the trolley and is used to locate the trolley with reference to the indicators 55 on the indicating means 54. As also indicated previously, screen 59 shows what is viewed by the television camera mounted on the grab 53 and particularly to indicate the distance of the grab from the tops of drums as indicated below. Television screens 62 and 63 are adapted to be connected to selected surveillance television cameras 60, 61 mounted on the bridge 51 of the overhead crane.

Control console 23 is provided with camera control knobs 479 for properly focusing and controlling the cameras to provide a good image on the television monitor screens.

The control console may also have means for recording the weights of the drums as they go into the drumming stations and the weights of the drums as they come out of the drumming stations. Push buttons and lights at the center of the console may be used to control the various operations of the drumming station manually if desired as indicated in said co-pending application. Means may also be provided to control the movement of the trolley on the bridge of the crane and the movement of the bridge itself and to control the grab hoisting means 104 on trolley 52 to move the grab 53 up and down. Means may also be provided to open and close the grab fingers and to control the rotation of the subframe 143 and grab fingers around axis A of the grab.

Additional Disclosure

It is apparent that various modifications may be made in the illustrated system, apparatuses and processes, and also that some or all portions of the illustrated apparatus may be used for purposes other than those indicated.

One modification can be the addition of a second heavy duty hoist 496 constructed and powered by conventional means, to the crane trolley (FIGS. 17, 18). The trolley 497 shown in these figures is otherwise similar to trolley 52 previously described. Hoist 496 which would be controlled as indicated previously from the control station 14, makes it possible to move considerably heavier articles then could be lifted by the grab 53 and its hoisting apparatus. For example, this heavy duty hoist makes it possible to remove the entire shield wall 214 and all of the equipment mounted on it, including the decanting tank 216, drumming equipment 215, and pumps 217*a*, 217*b*, 217*c* and their drives form the drumming station to another area for maintenance, as shown in FIG. 58. Furthermore, if any part or all of the unit made up of the shield wall and its associated apparatus, should become unusable due to radiation or other causes, it can be removed by the hoist for disposal as by burial. It is apparent that when such a heavy duty hoist adapted to carry a large load is provided, the crane bridge 51, the trolley 497, an; the track structure 47 should be designed and made to support and carry the additional loads.

As a further example of modification, while in the illustrated embodiment the decanting tank 216 is located above the drumming equipment 125, the decanting tank may be located in other locations and even outside of the drumming station; or a common decanting tank such as a power plant radioactive waste storage tank could be used as a decanting tank for one or more drumming stations.

In the illustrated embodiment two drumming stations are shown in the building; they provide added capacity and reliability if one station should be inoperative for any reasons. it is apparent that for smaller installations or where the reliability of two stations is not desired one drumming station may be used. For larger installations more than two drumming stations can be used.

While the illustrative embodiment discloses advantageous process and apparatus in which excess water is decanted from a tank to provide in the tank a proper proportion is introduced in a predetermined amount into a drum by a metering pump, it is apparent that desired amounts of a mixture of radioactive material, solidifying agent and liquid in proper proportions may be introduced into drums or other containers by other means; and that a solidifying agent be added at a time other than as disclosed above. Moreover, drums may be loaded or filled with predetermined amounts of radioactive materials in the form of liquids or slurries, without use in the drums of solidifying agents, and the drums may be handled and shipped with liquid contents. Since it appears that presnet regulations do not require shipment of radioactive wastes in solid form, it may be desirable to ship drumscontaining wastes in liquid or slurry form, and the inventive apparatus and process may be used for such purpose.

The term "fluent material" is intended to cover slurries or dispersions of particulate materials in liquids; liquids not containing particulate materials; and other flowable materials that may be handled according to the apparatus and process of the invention. The particulate materials may be of sizes different from those indicated above, as substantially larger.

While the container has been disclosed as a steel drum, it is apparent that other types of containers may be used.

Furthermore, although the invention has been discussed above in connection with the radioactive wastes resulting from boiling water or pressure water plants, the process and apparatus of the invention may be employed in connection with the disposition of other types of radioactive wastes, or radioactive wastes from other types of nuclear plants, such as those utilizing sodium or heavy water as heat transfer fluid; and the invention may be employed in connection with the handling of dangerous wastes or chemicals from other types of plants.

From the above disclosure, it is apparent that the invention provides process and apparatus in which, by remote control, radioactive waste or other dangerous materials may be handled, put into containers which are sealed, and the containers handled and moved, without exposure of personnel to dangerous radioactivity or other dangers arising from the materials. Wherever necessary, all portions of the system are fail safe, so failure of electric supply or energy fluid such as pressurized air will not cause damage or unsafe conditions. All possible drives, fluid cylinders, controls, and switches are located in safe areas, usually on the safe side of a shield wall. All equipment for handling radioactive waste material can be moved from areas of high radiation to areas of little or no radiation. For these reasons routine as well as essentially all major maintenance or repair work can be done safely with little if any exposure of maintenance or other personnel to any radiation.

Wherever the metal shield wall 214 that carries the operative drumming apparatus is penetrated by a drive, the drive is by means of a rotating or reciprocating shaft in such a manner that the operation is accurately performed and escape of radiation is prevented; this makes for reliability and safety.

To insure that the apparatus performs satisfactorily with the utmost safety to personnel and the environment, the apparatus of the invention has a high degree of redundancy or dualism in drives, controls, viewing means, lights, and monitoring means. For example, the apparatus is designed to avoid completely any spills of radioactive material during placement of the radioactive material in the drums, closing the drums and rotating them. But if a spill should occur during any of these steps, it is contained in the housing of the drumming equipment. Sprays are provided to wash the spills into a movable container or sump at the bottom of the housing; these sprays also cleanse the inside of the housing and equipment in it to deter radioactive contamination. The movable container is designed to cause the solid material to settle out and to be discharged into the plant drain.

These and other modifications may be made in the apparatus or process disclosed, and other modifications, advantages, and modes of operation will become apparent without departing from the spirit of the invention.

Having described our invention, we claim:

1. Apparatus for handling radioactive material comprising a rigid shield wall of material and thickness sufficient to reduce substantially harmful passage of radioactivity through said shield wall to a level that is not harmful to human operators; means, supported from one side of said shield wall that is exposed to radioactivity from said radioactive material, for handling radioactive material, said handling means including supporting means for supporting and moving a container adapted to contain radioactive material between a position at which radioactive material is introduced into said container through an opening thereof and a position at which closure means is placed to close said opening of said container, while said container is adjacent the side of the shield wall that is exposed to radioactivity, said handling means also including means at said last mentioned position operable to place closure means to close said opening of said container after radioactive material has been introduced therein; power means for operating said handling means located on the other side of said shield wall that is not exposed to radioactivity from said radioactive material; and movable means for driving said handling means, including said supporting means and said closure-placing means, which movable means extends through said shield wall to operate said supporting means and said closure-placing means from said power means without such harmful passage of radioactivity through said shield wall.

2. The apparatus of claim 1 in which said shield wall is formed in sections, abutting sections of said shield wall joining in a joint formed of abutting surfaces of such sections that are offset to eliminate a straight joint through said shield wall, and in which said handling means is supported from one of said sections of said shield wall, which section of said shield wall is adapted to be moved as a unit with said handling means supported from said shield wall section.

3. The apparatus of claim 1 comprising means for demountably supporting said shield wall, which shield wall is adapted to be removed from said supporting means and moved as a unit with said handling means supported from said shield wall.

4. Apparatus for handling radioactive fluent material capable of emitting radioactivity comprising a rigid shield wall of material and thickness sufficient to reduce substantial passage of radioactivity through said shield wall to a level that is not harmful to human operators; means, supported from one side of said shield wall that is exposed to radioactivity from said fluent material, for handling said radioactive fluent material, said handling means comprising pump means for introducing said fluent material into a container through an opening thereof while said container is adjacent said side of said shield wall exposed to radioactivity from said fluent material, said handling means also including means operable to place closure means to close said opening of said container after fluent radioactive material has been introduced therein; power means for operating said handling means located at the other side of said shield wall that is not exposed to radioactivity from said fluent material; and movable means for driving said handling means, including said pump means and said closure placing means, which movable means extends through said shield wall to operate said pump means and said closure placing means from said power means without such harmful passage of radioactivity through said shield wall.

5. The apparatus of claim 4 in which said power means is supported from said other side of said shield wall.

6. Apparatus for handling radioactive fluent material capable of emitting radioactivity comprising a rigid shield wall of material and thickness sufficient to reduce substantially passage of radioactivity through said shield wall to a level that is not harmful to a human operator; operable means for controlling flow of said fluent material comprising pump means for pumping said fluent material supported from one side of said shield wall that is exposed to radioactivity from said fluent material, said pump means comprising operable valve means; power means for operating said pump means and for operating said valve means located at the other side of said shield wall that is not exposed to radioactivity from said fluent material; and movable means for driving said pump means and for driving said valve means extending through said shield wall to operate said pump means and said valve means from said power means without such harmful passage of radioactivity through said shield wall.

7. Apparatus for handling radioactive fluent material capable of emitting radioactivity comprising a rigid shield wall of material and thickness sufficient to reduce substantially passage of radioactivity through said shield wall to a level that is not harmful to human operators; operable means for controlling flow of said fluent material comprising operable valve means that is supported from one side of said shield wall that is exposed to radioactivity from said fluent material; power means for operating said flow controlling means including said valve means located at the other side of said shield wall that is not exposed to radioactivity from said fluent material; and movable means for driving said valve means extending through said shield wall to operate said valve means from said power means without such harmful passage of radioactivity through said shield wall.

8. The apparatus of claim 7 in which said power means is supported from said other side of said shield wall.

9. Apparatus for handling radioactive fluent material capable of emitting radioactivity comprising a rigid shield wall of material and thickness sufficient to reduce substantially passage of radioactivity through said shield wall to a level that is not harmful to human operators; means, supported from one side of said shield wall that is exposed to radioactivity from said fluent material, operable to place closure means to close the opening of a container adapted to contain said fluent material; power means for operating said operable closure-placing means located at the other side of said shield wall that is not exposed to radioactivity from said fluent material; and movable means for driving said closure-placing means which movable means extends through said shields wall to operate said closure-placing means from said power means without such harmful passage of radioactivity through said shield wall.

10. The apparatus of claim 9 in which said power means is supported from said other side of said shield wall.

* * * * *